United States Patent

Yamade et al.

[11] Patent Number: 5,959,615
[45] Date of Patent: Sep. 28, 1999

[54] INFORMATION PROCESSING DEVICE

[75] Inventors: Kinya Yamade; Toshio Isoe, both of Tenri, Japan

[73] Assignee: Sharp Kabushiki Kaisha, Osaka, Japan

[21] Appl. No.: 08/891,080

[22] Filed: Jul. 10, 1997

[30] Foreign Application Priority Data

Sep. 25, 1996 [JP] Japan .................................. 8-252120

[51] Int. Cl.⁶ .................................................. G09G 5/00
[52] U.S. Cl. ............................ 345/173; 345/150; 345/179
[58] Field of Search .................................. 345/173, 174, 345/179, 180, 182, 183, 199, 150, 151, 157, 156, 145, 146, 104; 341/20; 178/18.01, 18.1, 19.01, 19.04

[56] References Cited

U.S. PATENT DOCUMENTS

| 5,262,778 | 11/1993 | Saunders | 341/20 |
|---|---|---|---|
| 5,311,207 | 5/1994 | Kusamoto et al. | 345/173 |
| 5,487,053 | 1/1996 | Beiwenger et al. | 345/173 |
| 5,534,886 | 7/1996 | Nomura et al. | 345/104 |
| 5,604,517 | 2/1997 | Filo | 345/173 |
| 5,610,629 | 3/1997 | Baur | 345/173 |
| 5,646,650 | 7/1997 | Miller | 345/173 |

FOREIGN PATENT DOCUMENTS

| 4-037945 | 6/1990 | Japan . |
|---|---|---|
| 6-187350 | 5/1993 | Japan . |

*Primary Examiner*—Xiao Wu
*Attorney, Agent, or Firm*—Nixon & Vanderhye P.C.

[57] ABSTRACT

An information processing device that can easily set a color for each scheduled item by pressure of a pen in order to distinguish important events at a glance on a color display of the device, wherein a bar graph on a schedule display screen can change its color to any desired one of three colors according to a controlled force of a pen, i.e., schedule (bar) becomes red, green and black when pressed strongly, medium and weakly respectively.

11 Claims, 24 Drawing Sheets

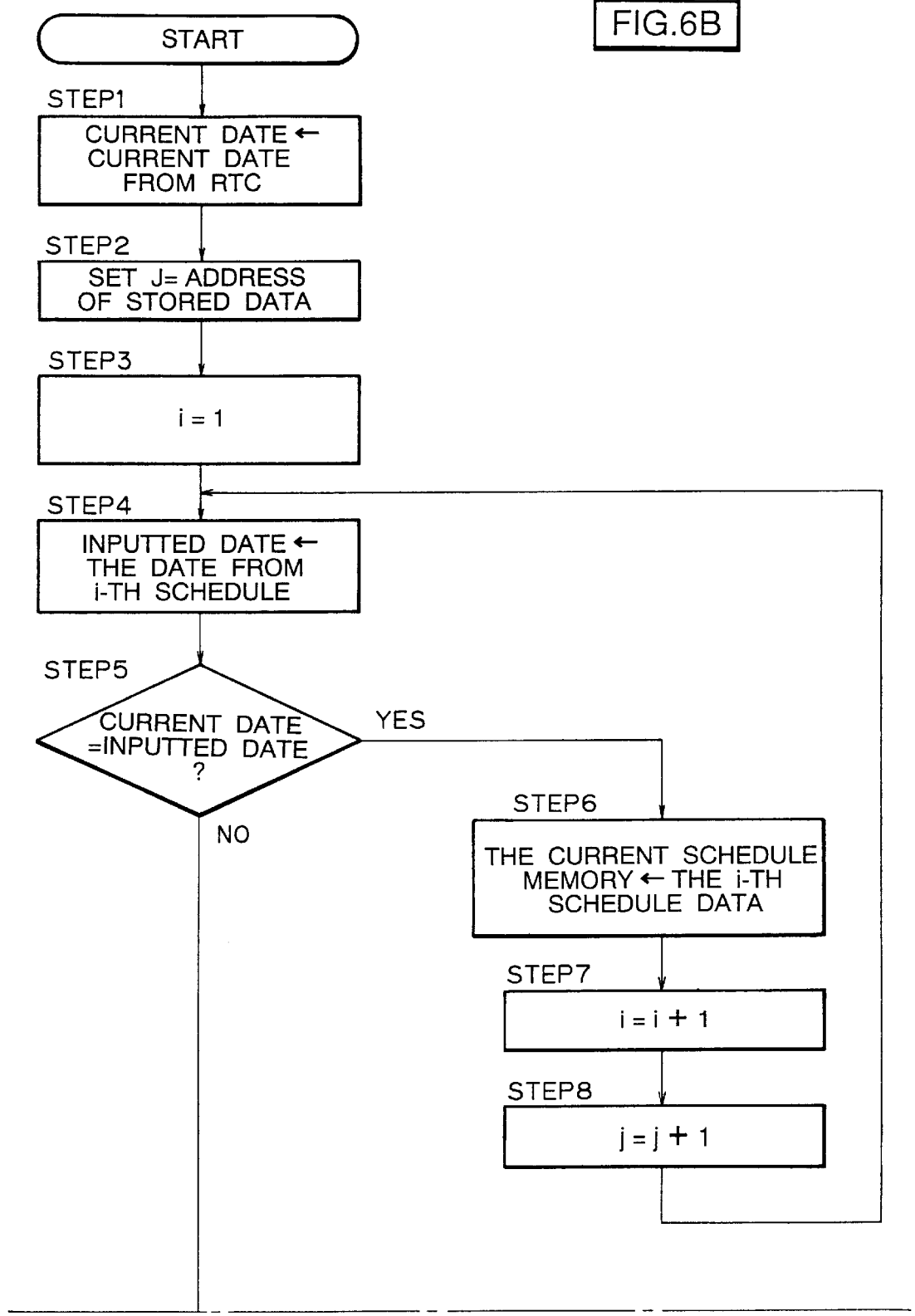

FIG.8

SCHEDULE

| SCHEDULE | MEMORIAL DAY | ADDRESS BOOK | TELEPHONE BOOK | CLOCK | COMMUNICATION | HELP | TOOLS |

OCT. 17TH   NEW   CORRECTION

7 · 9 · 11 · 1 · 3 · 5 · 7 · 9

| 8:00AM~10:00AM | 1-45 CONFERENCE ROOM |
| 0:00PM~ 1:00PM | LUNCHEON PARTY |
| 5:00PM~ 6:30PM | VISIT TO COMPANY A |

13 SUN. | 14 MON. | 15 TUE. | 16 WED. | 17 THUR. | 18 FRI. | 19 SAT.

| FIG.11A |
| FIG.11B |

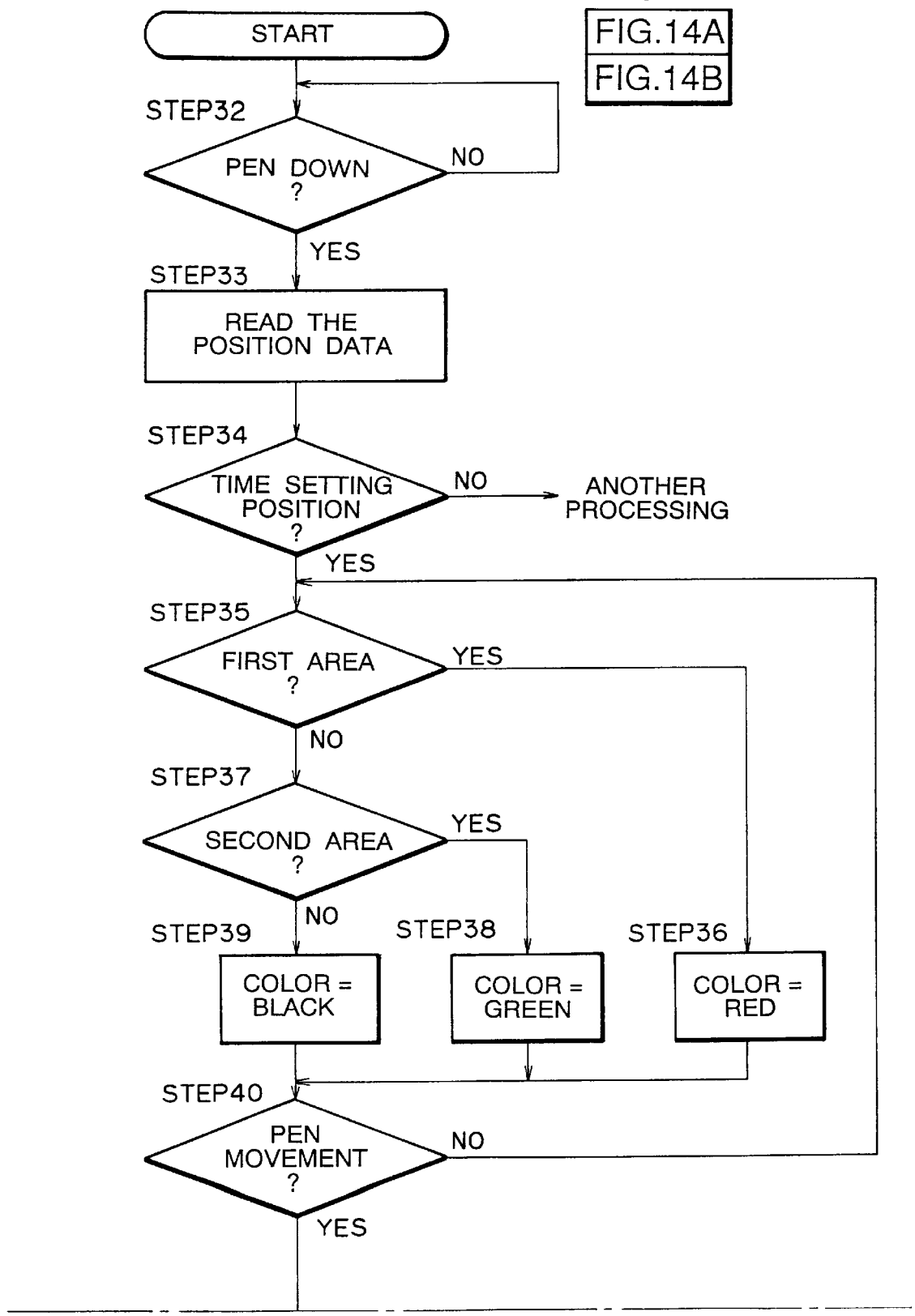

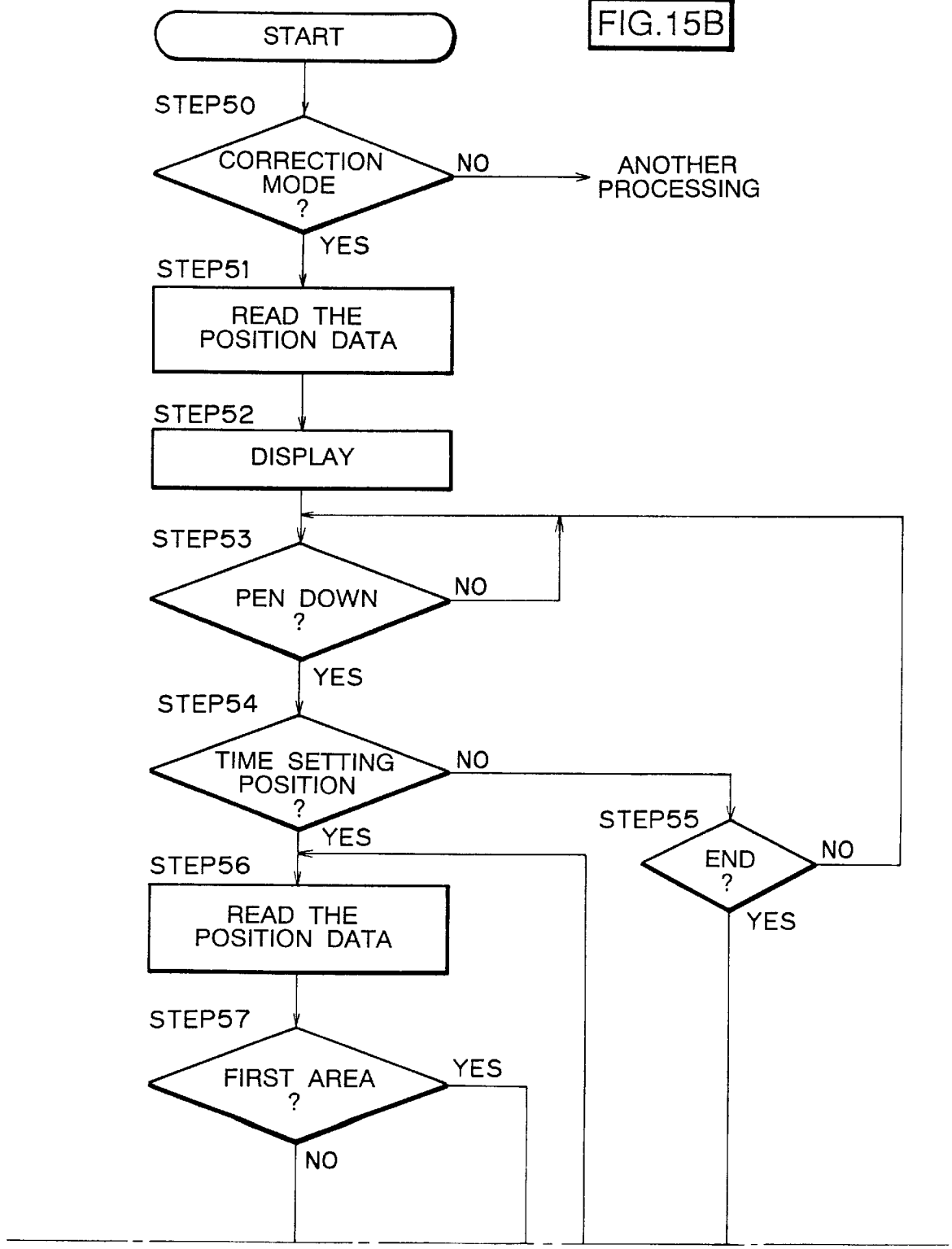

FIG.17
| FIG.17A | FIG.17B |
FIG.17A
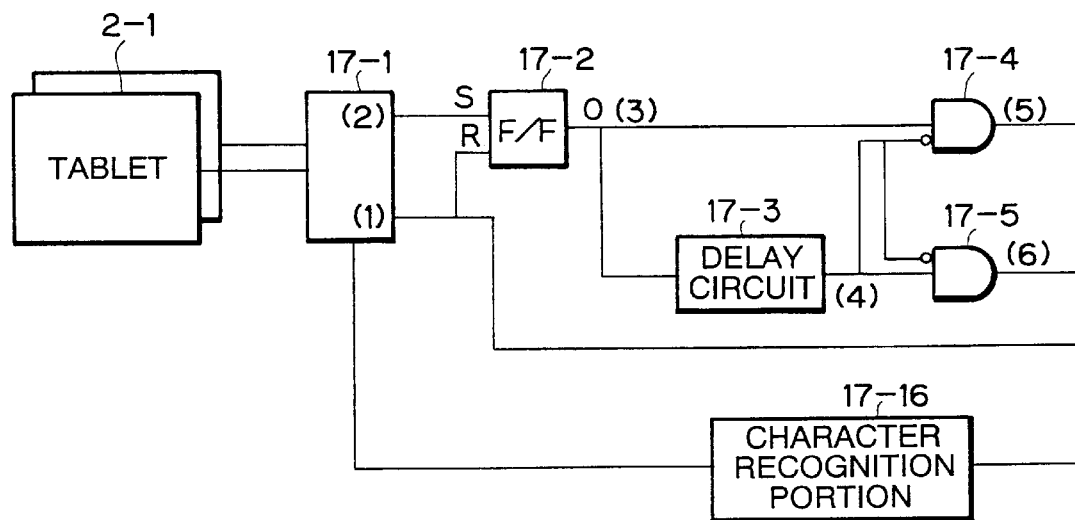
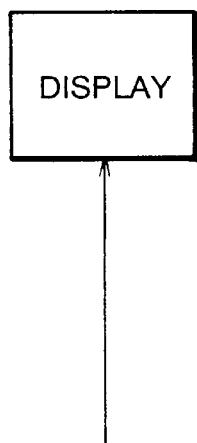

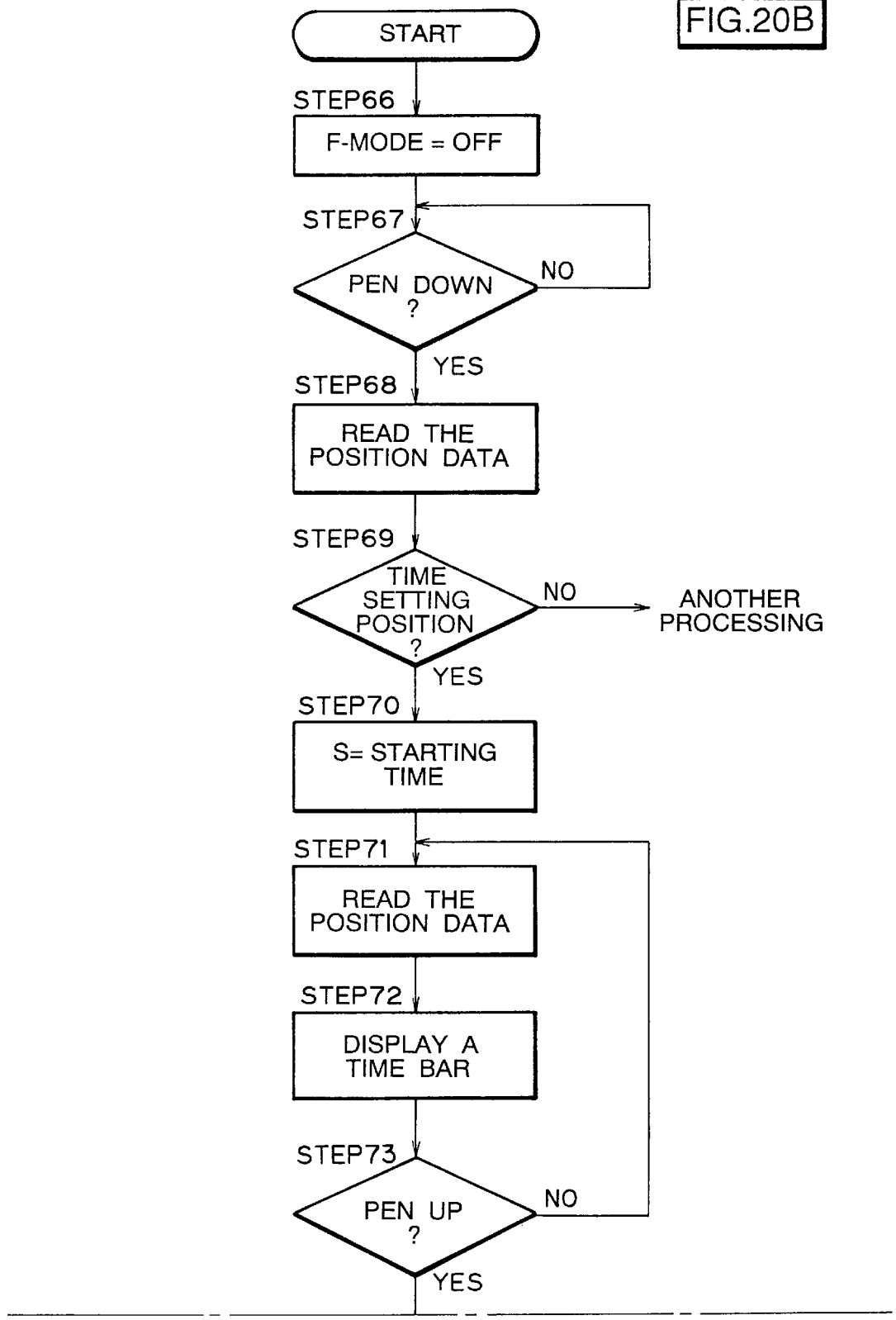

INFORMATION PROCESSING DEVICE

BACKGROUND OF THE INVENTION

Prior art devices are disclosed in Japanese Laid-open Patent Publications (TOKKAI HEI) No. 4-37495 and No. 6-187350.

The prior art disclosed in Japanese Laid-open Patent Publication (TOKKAI HEI) No. 4-37495 is intended to easily check the content of a schedule whether events and things fall on the same time by inputting/storing a plurality of items to be scheduled at a time. This art makes it possible to display the items falling on the same time in the schedule in such a way that a part of the schedule, wherein the items are overlapped, may be expressed differently from the other normally scheduled parts.

The prior art disclosed in Japanese Laid-open Patent Publication (TOKKAI HEI) No. 6-187350 is directed to a method of visually grasping reservations of conference rooms, by which states of the rooms are classified into "vacant", "occupied" and "special" states which are expressed in different colors.

The above-mentioned prior arts, however, require two processing steps: designation of different colors for different states by using special color-designating keys and inputting scheduled time-data by using numeral keys. The setting means are complex.

SUMMARY OF THE INVENTION

The present invention relates to an information processing device provided with a scheduling function, e.g., a portable information terminal or an electronic pocket notebook.

An object of the present invention is to provide an information processing device that can easily set a color for each scheduled item by pressure of a pen in order to recognize important events at a glance on a color display of the device.

Another object of the present invention is to provide an information processing device that can easily set a color for each scheduled item by a position pressed by a pen.

A further object of the present invention is to provide an information processing device that can easily set a flickering sign for indicating the importance of a scheduled item by a simple operation of a pen.

To realize the above-mentioned objects, the present invention was made to provide:

(1) an information processing device provided with a scheduling function, which comprises display, tablet input structure integrally made with the display, a pointer for specifying an input time-axis displayed on the display, a detector for detecting a pressing force on the tablet input structure according to an instruction given by the pointer, setting structure for setting a display color according to the pressing force detected by the detector, and a controller for controlling the display to display thereon an input time and a content of a schedule in a color designated by the setting structure;

(2) an information processing device as described in item (1) above, wherein a displacement on the tablet input structure according to the pointer is detected and a display color set by the setting structure is maintained during the movement of the pointer;

(3) an information processing device provided with a scheduling function, which comprises displaying structure, tablet input structure made integrally with the display, a pointer for specifying a input time-axis displayed on the display, a detector for detecting a pressing position on the tablet input structure according to an instruction given by the pointer, setting structure for setting a display color according to the pressing position detected by the detector, and a controller for controlling the display to display thereon an input time and a content of a schedule in the color specified by the setting structure;

(4) an information processing device as described in item (3) above, wherein a displacement on the tablet input structure according to the pointer is detected and a display color set by the setting structure is maintained during the movement of the pointer; and (5) an information processing device provided with a scheduling function, which comprises display, tablet input structure made integrally with the display, a pointer for specifying an input time-axis displayed on the display, a detector for detecting a pressing state on the tablet input structure according to an instruction given by the pointer, setting structure for setting a display color according to the pressing state detected by the detector, and a controller for controlling the display to display thereon by flickering an input time and a content of a schedule in the color specified by the setting structure.

BRIEF DESCRIPTION OF THE DRAWINGS

FIG. 6 shows the correct alignment of the drawing sheets for FIGS. 6A and 6B.

FIG. 6A is a flow chart describing the process of displaying a selected daily schedule.

FIG. 8 is illustrative of an exemplified daily schedule display.

FIG. 14 shows the correct alignment of the drawing sheets for FIGS. 14A and 14B.

FIG. 14A is a flow chart describing the process of designating a color.

FIG. 15 shows the correct alignment of the drawing sheets for FIGS. 15A and 15B.

FIG. 15A is a flow chart describing the process of changing a color.

FIG. 17 shows the correct alignment of the drawing sheets for FIGS. 17A and 17B.

FIG. 17A is a detailed block diagram.

FIG. 20 shows the correct alignment of the drawing sheets for FIGS. 20A and 20B.

FIG. 20A is a flow chart describing the process of setting a flicker indication.

PREFERRED EMBODIMENTS OF THE INVENTION

Referring now to the accompanying drawings, preferred embodiments of the present invention will be described below in detail. However, it must be understood that embodiments explain the present invention and do not restrict the scope of the invention.

Figure 1:
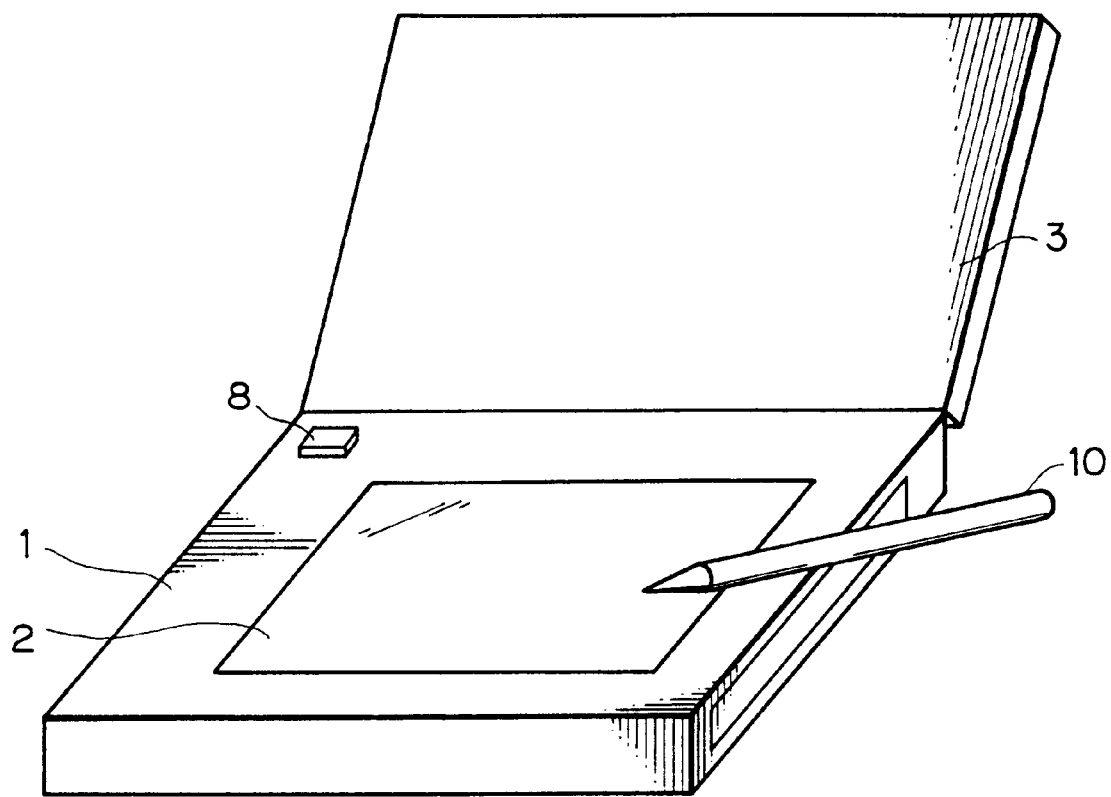
FIG. 1 is an external perspective view of an information processing device according to the present invention.

FIG. 1 is a perspective external view of an information processing device according to the present invention, which comprises a body cabinet 1, an input-output portion 2, a cover 3 and a pen 10.

The body cabinet 1 has an infrared transmitter (not shown) and a pen holder (not shown). It contains the input-output portion 2 (a display unit 2-1 made integrally with a transparent tablet 2—2) and an electric source for supplying current to the infrared transmitter, an interface control circuit and other circuits. The input-output portion 2 will be described later in detail with reference to FIG. 2.

The cover 3 is turnably connected by a hinge to the back of the body cabinet 1. It protects the input-output portion 2 during the transporting the device.

The pen 10 has a pressure sensor 10-1 for sensing a pressing force of the pen against a screen, which sends a detected force signal over wiring or radio.

The body cabinet 1 has an electric power supply 8 for switching ON and OFF the electric power circuit of the body.

Figure 2:
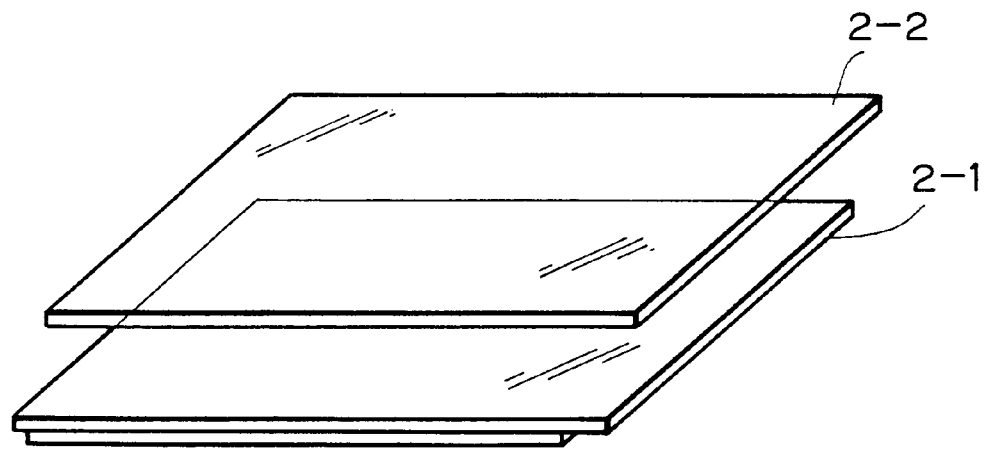
FIG. 2 is an exploded perspective view of an input-output portion.

FIG. 2 is an exploded perspective view of the input-output portion 2 that comprises a thin matrix type LCD (liquid-crystal display) unit 2-1 displayable colored character et al. with a transparent tablet 2—2 integrally covering the LCD unit 2-1. The LCD unit 2-1 may be provided, if need be, at its rear side with back light that may be an EL (electro-luminescence) panel.

The transparent tablet 2—2 may be composed of two transparent sheets having respective transparent electrodes printed on their inside surfaces and regularly arranged protruding spacer printed on the same inside surfaces to separate electrodes from each other in a normally unpressed state. Namely, transparent electrodes come into contact with each other at a position whereto a finger force or pen tip force is applied. The selected (pressed) position of the transparent tablet 2—2 can be detected by the contact of the electrodes therein.

The position on the LCD unit 2-1, which was selected by a User through the transparent tablet 2—2, can be detected by synchronizing the indication on the LCD unit 2-1 with the selected position information.

Figure 3:
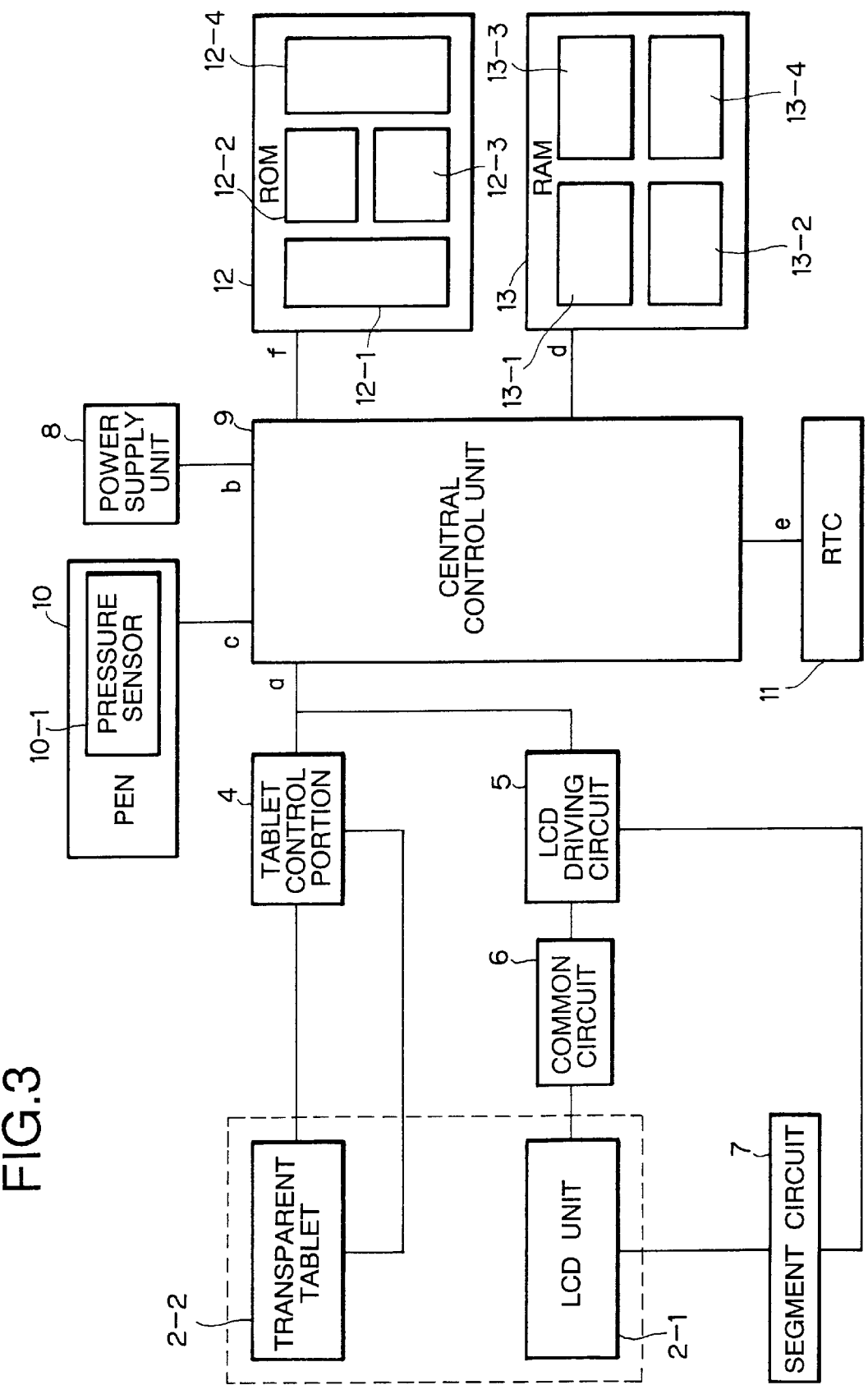
FIG. 3 is a block diagram of an information processing device according to the present invention.

FIG. 3 is a block diagram of an information processing device according to the present invention. This information processing device comprises a LCD unit 2-1, a transparent tablet 2—2, a tablet control portion 4, a LCD driving circuit 5, common circuit 6, segment circuit 7, a power supply unit 8, a central control unit 9, a pen 10, a RTC 11, a ROM (read-only memory) 12 and RAM (random access memory) 13.

The tablet control portion 4 takes coordinate information from the transparent tablet 2—2 through connections with each of transparent electrodes formed in each of two transparent sheets composing the transparent tablet 2—2. A position on the tablet, which is designated by a finger or a pen, is detected in terms of coordinates of contact made between two opposite electrodes in the transparent tablet 2—2.

The LCD driving circuit 5 holds therein a bit map of dots to be displayed. It can send signals to the common circuit 6 and the segment circuit 7 to light necessary dots to be displayed on the LCD unit 2-1.

The central control unit 9 controls input information or output information by using a variety of instructions. It has a control line (a) from the tablet control portion 4, a control line (b) from a power supply unit 8, a control line (c) from the pressure sensor 10-1 of the pen 10, a control line (d) from a schedule memory 13-2 of the RAM 13, a control line (e) from the RTC 11 for comparing a date with calendar information and a control line (f) from the ROM 12.

The RTC 11 outputs a current time information [year, day and time], measuring a time by clock signals (not shown).

The ROM 12 has a program area 12-1 for storing a program of the activities of the central control unit 9, a calendar-information program-area 12—2 for calculating a date, a program area 12-3 for converting into bit-image information to be displayed on the LCD unit 2-1 and a coordinate conversion area 12-4 for storing conversion information used for converting coordinates of a position detected by the tablet control portion 4 into corresponding coordinates of information displayed on LCD unit 2-1.

The RAM 13 has a character storing area 13-1 for storing character information (e.g., a sentence) inputted by a User from the input-output portion 2, a schedule storing area 13-2 for storing schedule data, a color information storing area 13-3 for storing color information for each scheduled item and a current-day schedule storing area 13-4 for storing a schedule of only the current date. The schedule storing portion 13-2 stores schedule data in sequence of date and time.

Figure 4:
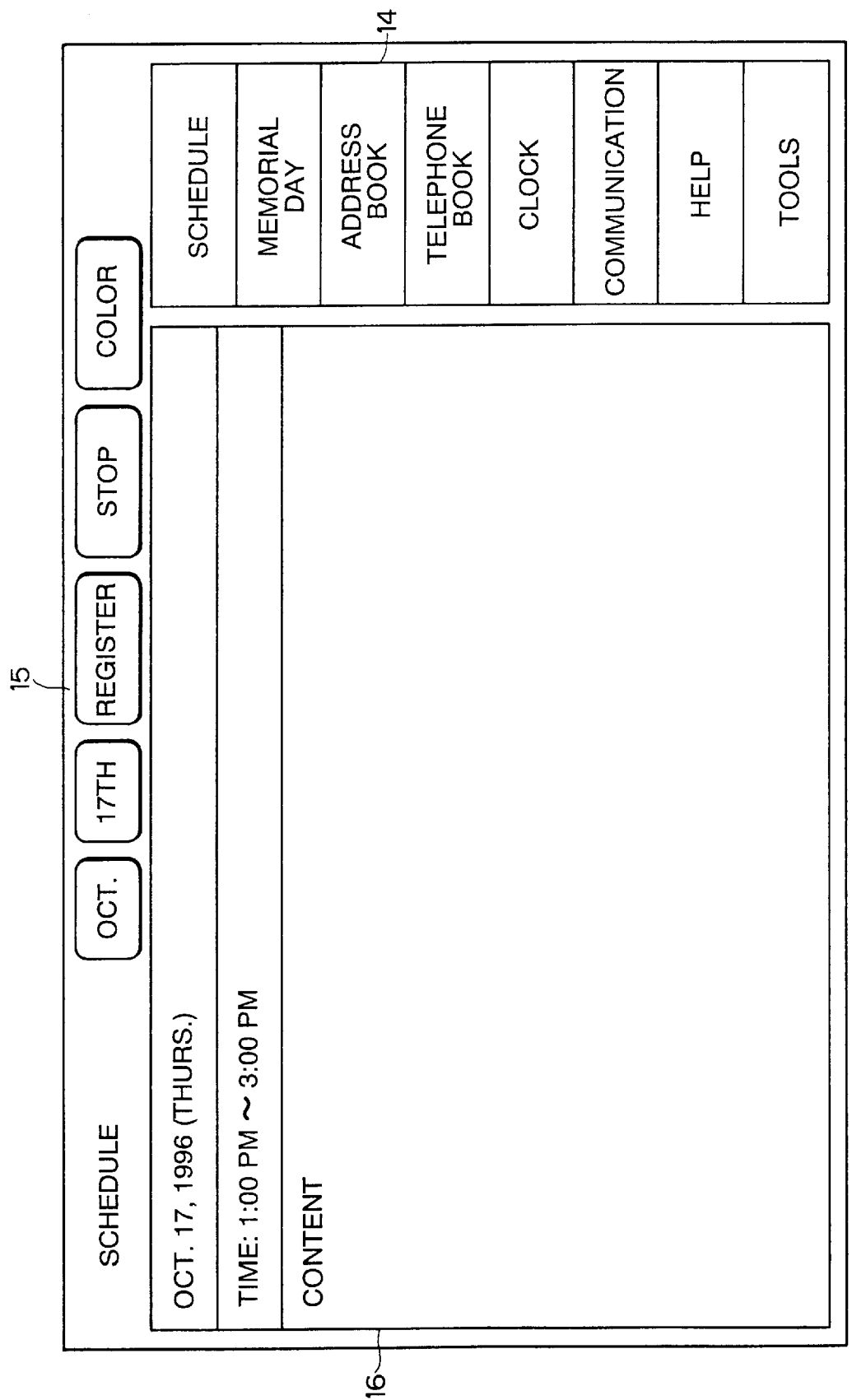
FIG. 4 is illustrative of an exemplified schedule data-entry screen of a display.

FIG. 4 shows an example of an input display screen for inputting schedule data. The schedule data inputting screen consists of a function selecting area 14, a process selecting area 15 and an input-output area 16. A schedule content (e.g., date, time and place) is inputted by writing necessary data with a pen on the input-output area 16 with recognizing the written data or by key-selecting necessary key symbols indicated on the input-output area. The inputted data is stored into the schedule storing area 13-2 of the RAM 13 by touching a button "REGISTER". The schedule content to be stored has to include essential entries "date", "time" and "name of event".

Figure 5:
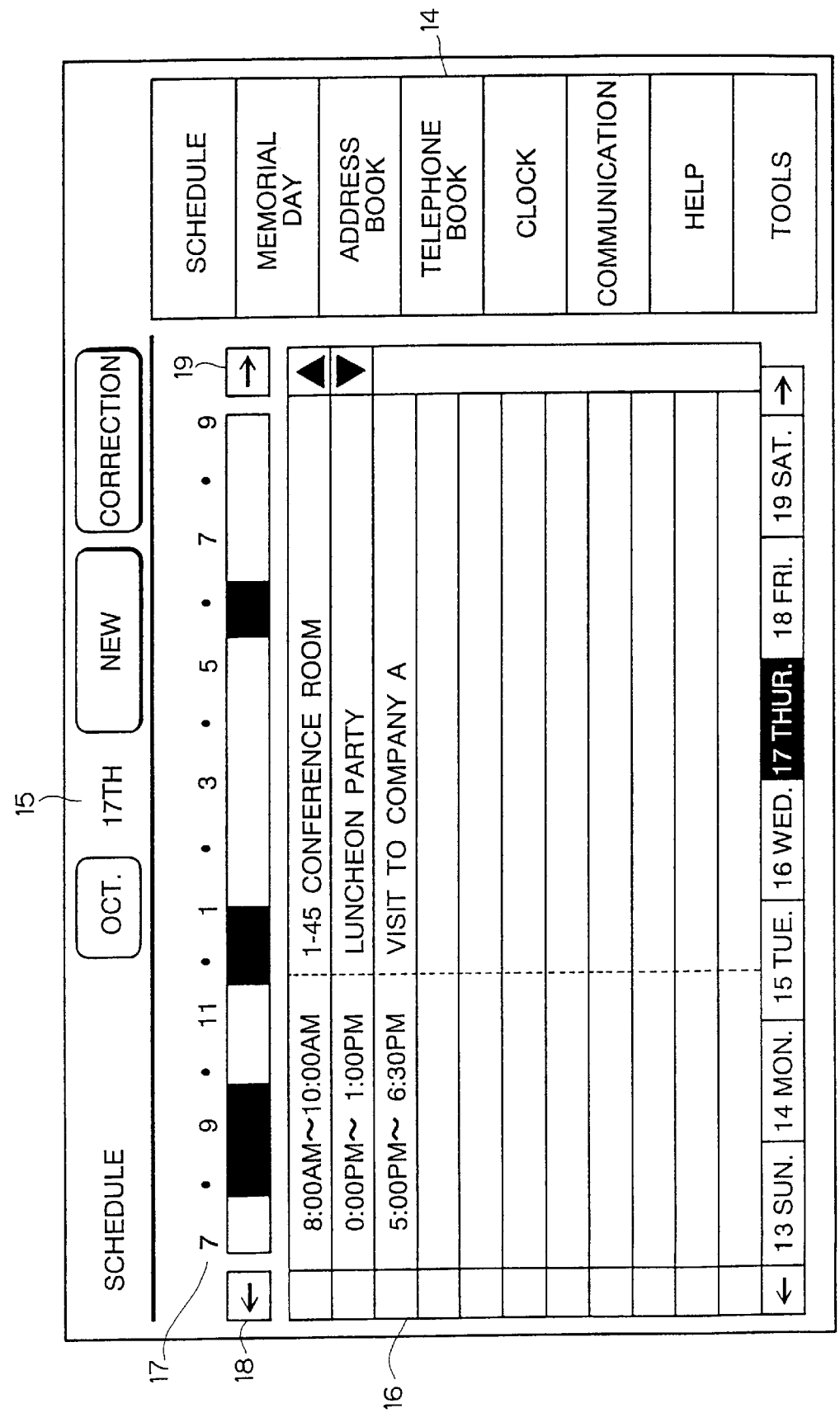
FIG. 5 is illustrative of an exemplified daily schedule display.

The content being currently input is abandoned without being stored when a button "STOP" is touched with the pen on the schedule input screen. The scheduling function has three different input display screens: monthly scheduling screen (not to be described in this embodiment) appears when a button "MONTH" is touched, a daily scheduling screen (as shown in FIG. 5) appears when a button "DAY" is touched and a color designating screen (as shown FIG. 7) appears when a button "COLOR" is touched. In the last case, a unit color is selected for distinguishing a remarkable schedule to be written.

FIG. 5 shows an example of a daily schedule display screen of the device. Touching a button "NEW" turns the current screen to the schedule inputting screen shown in FIG. 4. Touching a button "CORRECT" causes the detailed content of the remarkable schedule to be displayed, wherein the device works in "correcting" mode, allowing inputting necessary corrections.

The content of the schedule is displayed in such a way that remarkable data and usual data are displayed in different colors from each other and a bar chart 17 shows corresponding colored bars. Time scroll buttons 18 (left arrow) and 19 (right arrow) are used for entering time bands at the leftmost (earlier time) and the rightmost (later time), respectively, of the screen causing the line to move to right and left.

Figure 6B:
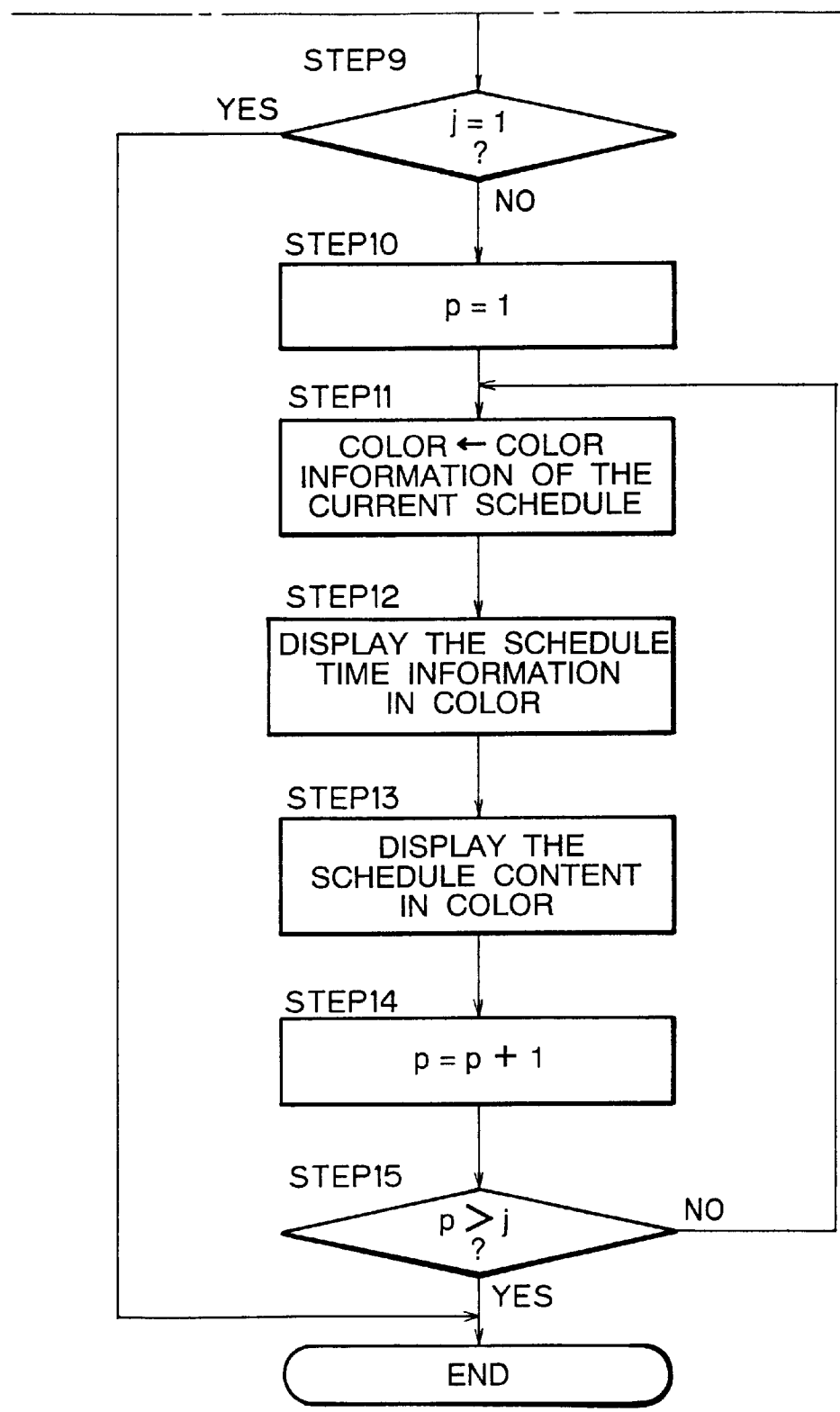
FIG. 6B is a flow chart describing the process of displaying a selected daily schedule.

FIGS. 6A and 6B are flow charts describing steps of processing a schedule of a selected date to be displayed.

At Step 1, the current date is read from the RTC 11.

At Step 2, a counter (j) is set to indicate a first data-position in the current-day-schedule storing area 13-4 of the RAM 13, whereat a first schedule of the present day is stored.

At Step 3, a counter (i) indicating the number of scheduled events is initialized (i=1).

At Step 4, the date is read from the content of the i-th schedule event stored in the schedule storing area 13-2 of the RAM 13.

At Step 5, the date read-out at Step 4 is compared with the current date read from the RTC 11.

If Step 5 proves the input date is the current date, i.e., data to he displayed, Step 6 stores the scheduled data into the current-day-schedule storing area 13-4 of the RAM 13, then Step 7 makes an increment of the counter (i) and Step 8 makes an increment of the counter (j). The process returns to Step 4 for further retrieval of schedule data.

If Step 5 proves the input date is different from the current date, the process proceeds to Step 9 that determines whether the counter (j) is "1" or not. If so, the process ends since there is no data to be displayed.

If the counter (j) indicates 2 or more for indicating there is still left data to be displayed, the process advances to Step 10 that initializes a schedule counter (p). Step 11 reads color information of scheduled data stored in the color information storing area 13-3. At Step 12, the scheduled time information is represented by a bar chart in the specified color corresponding to the color information read-out at Step 11. At Step 13, event-information is represented in the specified color corresponding to the color information read-out at Step 11.

At Step 14, a counter (p) is incremented. At Step 15, it is determined whether or not the through-out content of the current-day-schedule storing area 13-4 in the RAM 13 was displayed by judging that the display schedule counter (p) is larger than the counter (j). If not, the process returns to Step 11 to continue displaying. The process ends if all items of the current day schedule were displayed.

Figure 7:
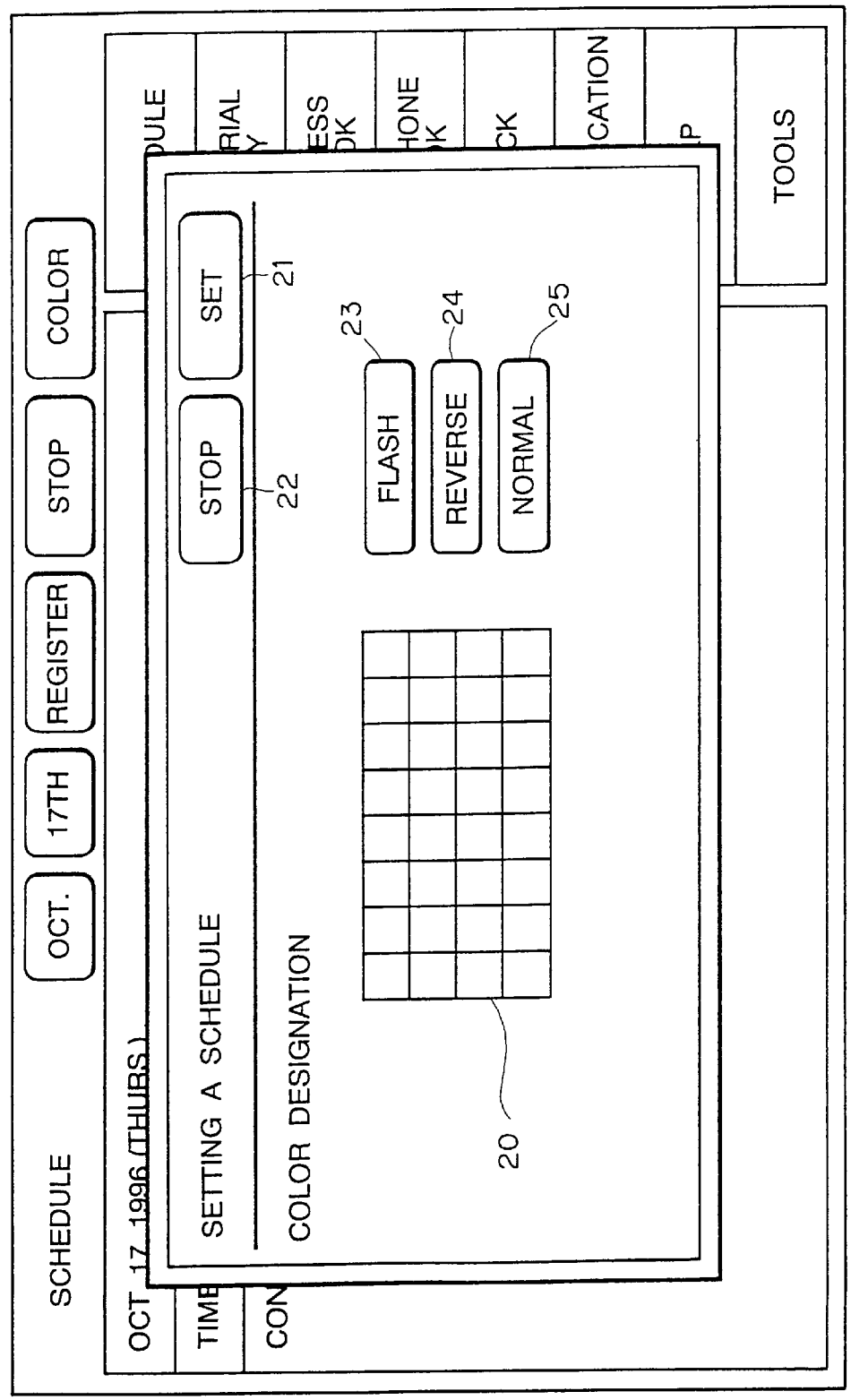
FIG. 7 is illustrative of an exemplified display screen for specifying colors.

FIG. 7 shows an example of a color specifying screen. Referring to FIG. 7, a method of setting and displaying a scheduled time is described as follows:

A color designating frame including a pallet 20 as shown in FIG. 7 appears on a display screen by pressing the "COLOR" button indicated on the schedule inputting screen shown in FIG. 4.

A desired color is selected from the pallet 20 and a button 21 is touched with the pen whereby color information is set in the color-information storing area 13-3 of the RAM 13, and the color of the display is changed. Touching the "STOP" button with the pen causes the selected color to be abandoned without being set and the color-selecting frame of FIG. 7 disappears.

The functions of buttons "FLASH" 21, "REVERSE" 22 and "NORMAL" 23 will be described later.

FIG. 8 shows an example of a daily schedule displaying screen.

Referring to FIGS. 7 and 8, the display screen is described as follows:

It is possible to flash any desired schedule by using the "FLASH" button 23 shown on the color designating screen of FIG. 7. The flashing display is realized by the central control unit 9 that, receiving a pulse per second from a clock pulse generating (CG) portion (not shown in FIG. 3), causes only the schedule designated by the "FLASH" button 23 to repeat a cycle of normal indication and reverse indication. Information to be displayed looks as if it was flickering.

The "REVERSE" button 24 is used for reversing the state of the displayed characters. The NORMAL button 25 is used for turning the FLASH displaying state by the "FLASH" button 23 or the REVERSE displaying state by the "REVERSE" button 24 to the normal state. It is also possible to provide a scrolling display mode besides the reversing mode and the flashing mode. Thus, any schedule can be accented as shown by way of example in FIG. 8.

[First Embodiment]

Figure 9A:
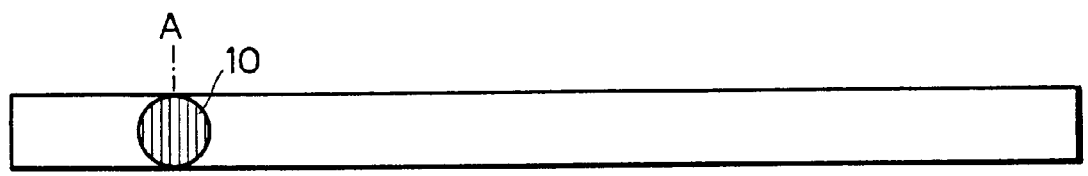
FIG. 9A is a view for explaining a method of using a pen.
Figure 9B:
FIG. 9B is a view for explaining a method of using a pen.
Figure 10:
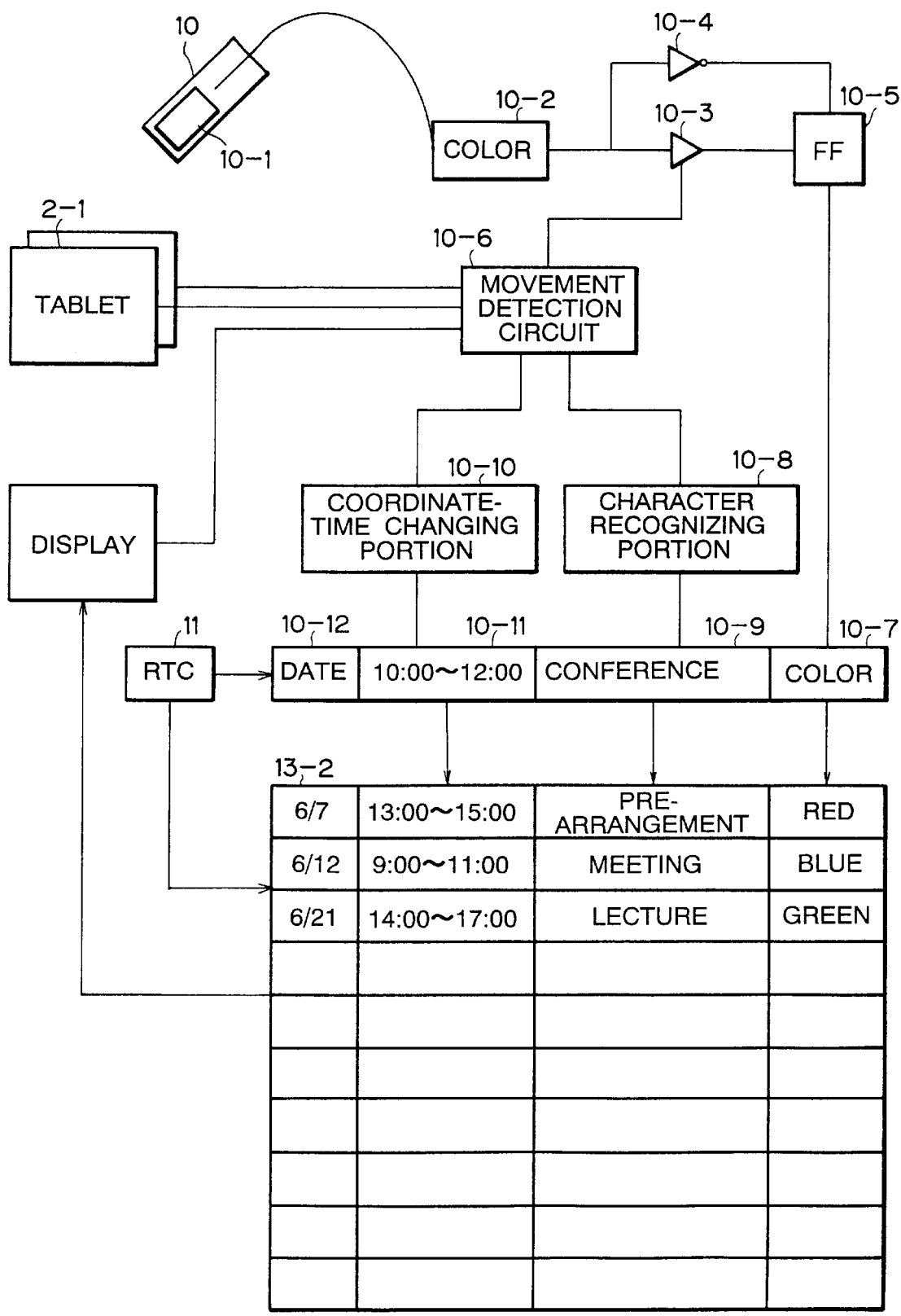
FIG. 10 is a detailed block diagram.
Figures 11, 11A:
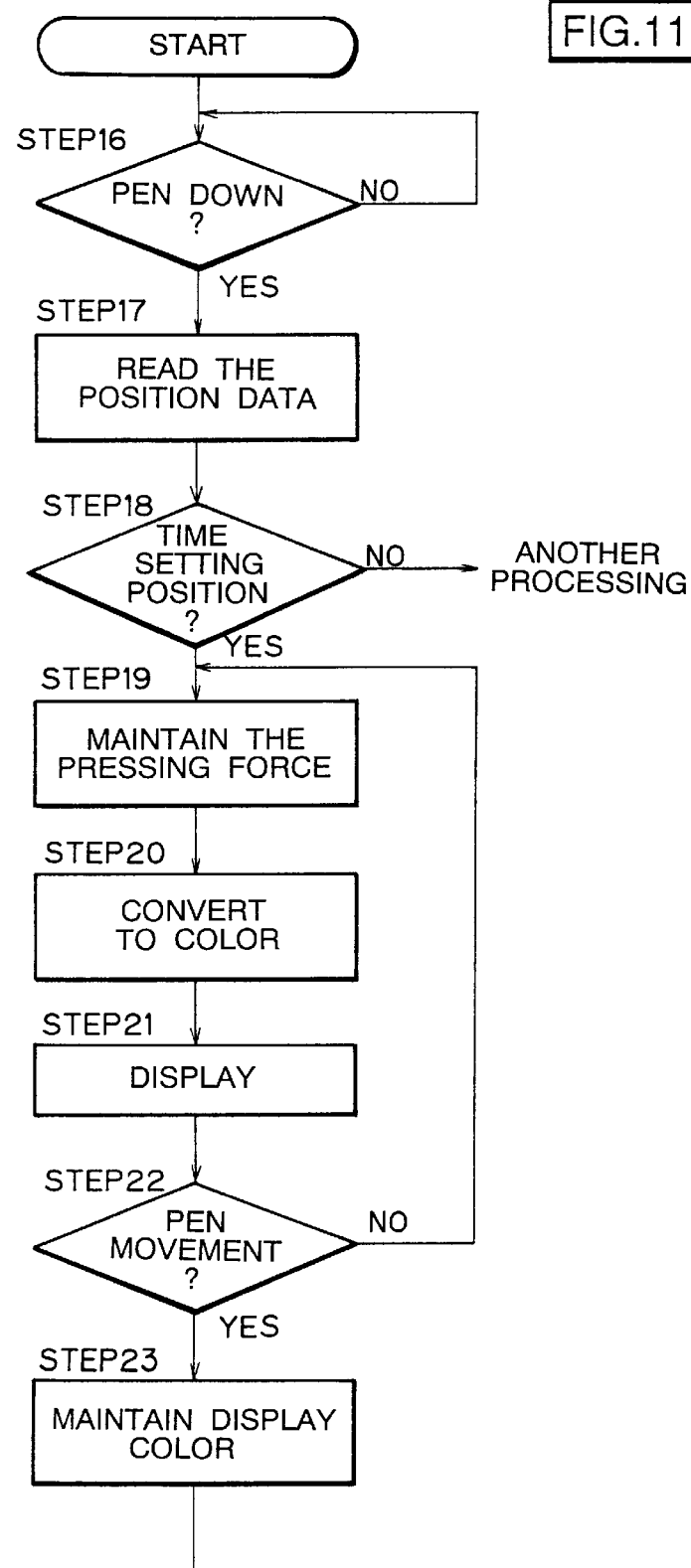
FIG. 11 shows the correct alignment of the drawing sheets for FIGS. 11A and 11B.
FIG. 11A is a flow chart describing the process of designating colors.
Figure 11B:
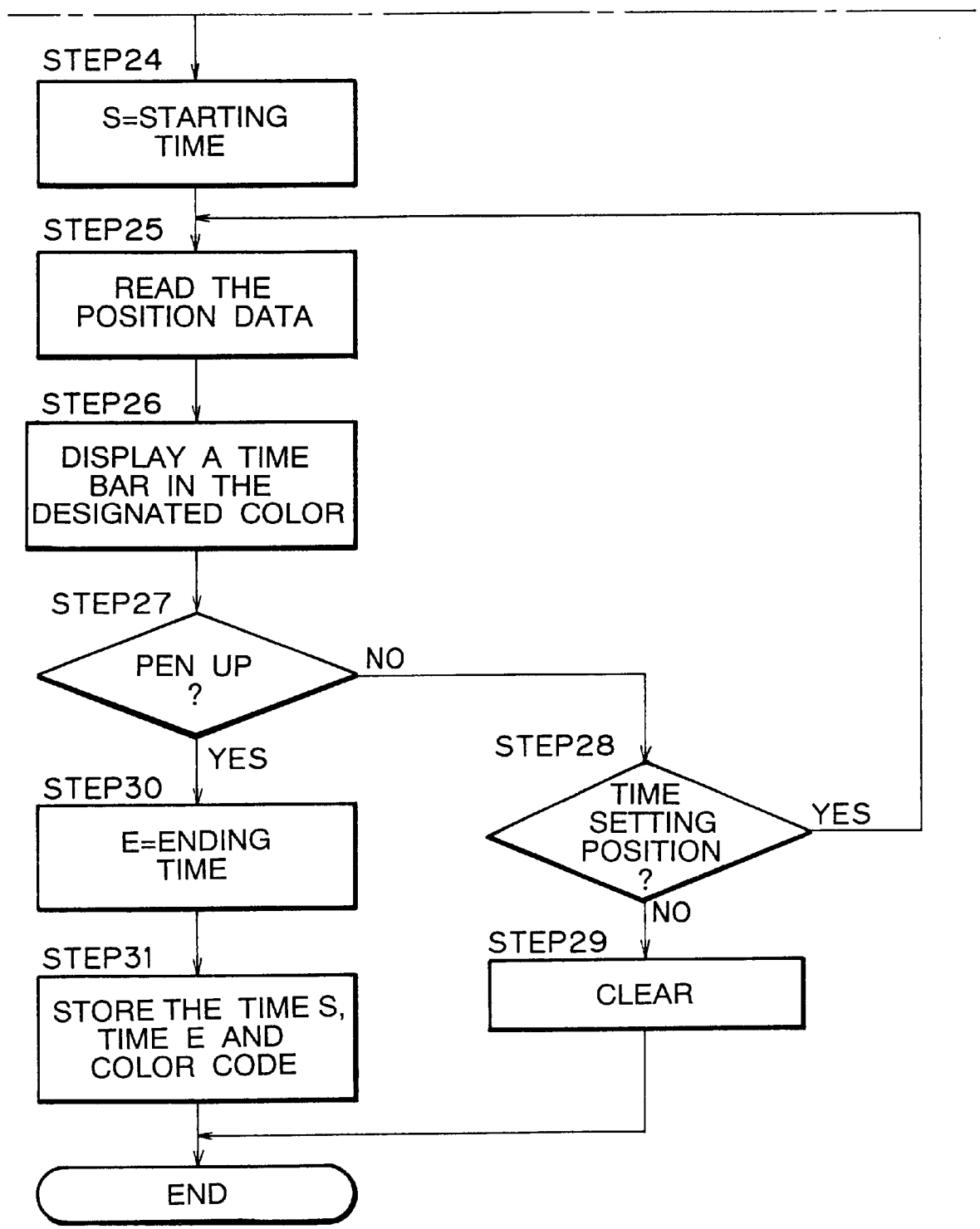
FIG. 11B is a flow chart describing the process of designating colors.

Referring FIGS. 9A and 9B showing a method of using a writing pen, FIG. 10 showing a detailed block diagram and FIGS. 11A and 11B describing a flow chart, the first embodiment of the present invention will be described as follows:

When a user moves the writing pen along a desired time band of a bar chart, in which information shall be input, on a daily schedule display screen shown in FIG. 5, a schedule inputting screen of FIG. 4 appears similarly to the case of touching the "NEW" button. The time band traced on the bar chart 17 of the daily schedule display screen of FIG. 5 is now displayed, allowing entering necessary corrections therein.

The display color of the schedule can be previously selected by a first pressing force of the pen in tracing the bar chart 17 on the daily schedule displaying screen of FIG. 5. Red color, green color and black color can be selected by pressing the pen against the bar chart with three levels of pressing force value; a strong force, a medium force and a weak force.

FIGS. 9A and 9B show a method of using the writing pen in the first embodiment. The position A in FIG. 9A illustrates a pen 10 being in touch with the position from which the schedule begins. The position B in FIG. 9B illustrates the pen having moved (dragged) to the position of the schedule ending time. With the pen 10 in the state shown in FIG. 9A, the pressing force of the pen against the screen is detected and a color corresponding to the detected force is previously set for the schedule to be displayed. Namely, the time band from the position A to the position B in FIG. 9B will be displayed in the selected color.

Referring to the block-diagram of FIG. 10, the above-mentioned operation is described as follows:

First, a force of pressing the bar chart by a user with a pen 10 is detected by a pressure sensor 10-1 whereby a detected force signal is transferred to a color-code converting circuit 10-2 that in turn transmits a color code "11" (red) or "10" (green) or "01" (black) according to the detected force signal "strong" or "medium" or "weak".

The movement of the pen is detected by a movement detection circuit 10-6 in a transparent tablet 2-1, by which a gate 10-3 is momentarily opened, a flip-flop circuit 10-5 is set and the color code is transmitted to a buffer 10-7 for storing color codes for the input schedule data.

Lifting the pen from the tablet causes the transmitted color code to be inverted through the gate 10-4 and reset the flip-flop circuit 10-5.

When the content of the schedule was inputted by the user with the pen, a character-recognizing portion 10-8 recognizes the input characters from the pen stroke data detected by the movement detection circuit 10-6 and transmits the recognized character data to a buffer 10-9 for storing schedule contents. Inputting the characters describing the schedule content can be done by touching a soft keyboard with the pen. In this case, the pen touching positions are detected.

The time band specified by the user is determined by a coordinate-time changing portion 10—10 according to the information on the pen-touch start position and the dragging end position. The determined time band information is stored into a buffer 10-11 for storing schedule time data. The date of the schedule is read from the RTC 11 and stored into a buffer 10-12 for storing schedule date data. These data are stored in sequence of date in a schedule storing area 13-2 of a RAM 13.

The above-mentioned processing operations are described below according to flowcharts of FIGS. 11A and 11B.

Step 16 detects a touch of a pen with a screen, Step 17 reads a position where the pen touched and Step 18 determines whether or not the read position is included in a bar chart 17 for setting a schedule time. If the position touched with the pen is out of the position for setting a time, processing operation required by the position is performed. If the position is the position for setting a schedule time, the process proceeds to Step 19 whereat a pressing force of the pen is detected and temporarily stored by a pressure sensor 10-1 mounted in the pen. Next at Step 20, the detected force of the pen is converted into a color code in accordance with the level (one of three levels) of the detected force value. At Step 21, dots of the pen-touched position are colored in red on the screen if it is pressed with a strong force (high level force). At Step 22, it is judged whether or not the pen was moved in touch with the screen. If not, the process returns to Step 19.

At Step 23, the color obtained at Step 20 is maintained if the pen was moved while in touch with the screen. At Step 24, the position the pen touched first is stored in a variable S as the start time of the schedule. At Step 25, the current touching position of the pen is read. Next at Step 26, the trace of the pen is represented as a time bar in the color memorized at Step 23. At Step 27, it is judged whether the pen was separated from the screen or not. If so, the process proceeds to Step 30. If the pen still is touching the screen, the process advances to Step 28 whereat it is judged whether or not the pen remains on the position for setting a schedule time. If so, the process returns to Step 25 and, then, Steps 25 to 28 are repeated until the pen is lifted off the screen. If the pen is out of the time-setting position, the process advances to Step 29 whereat display of the pen trace is cleared.

When the pen was judged as separated from the screen at Step 27, the process proceeds to Step 30 whereat a time corresponding to the position whereat the pen was lifted off is stored as a variable E defining a schedule ending time. Next, Step 31 stores the starting time S and the ending time E together with the color code stored at Step 23.

Thus, the display color of the schedule can be set by the pressing force of the pen at the dragging start position, enabling the schedule (the trace of the pen) to be displayed in the same color, independent of change in force of the pen during the dragging operation.

[Second Embodiment]

Figure 12A:
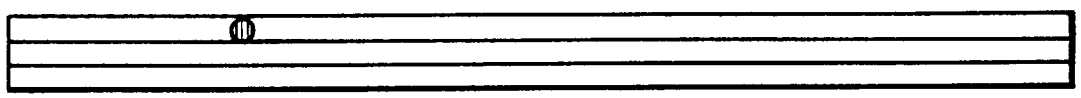
FIG. 12A is a view for explaining a method of using a pen.
Figure 12B:
FIG. 12B is a view for explaining a method of using a pen.
Figure 12C:
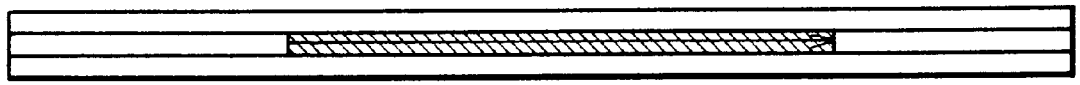
FIG. 12C is a view for explaining a method of using a pen.
Figure 12D:
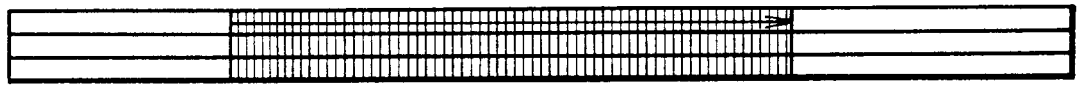
FIG. 12D is a view for explaining a method of using a pen.
Figure 13:
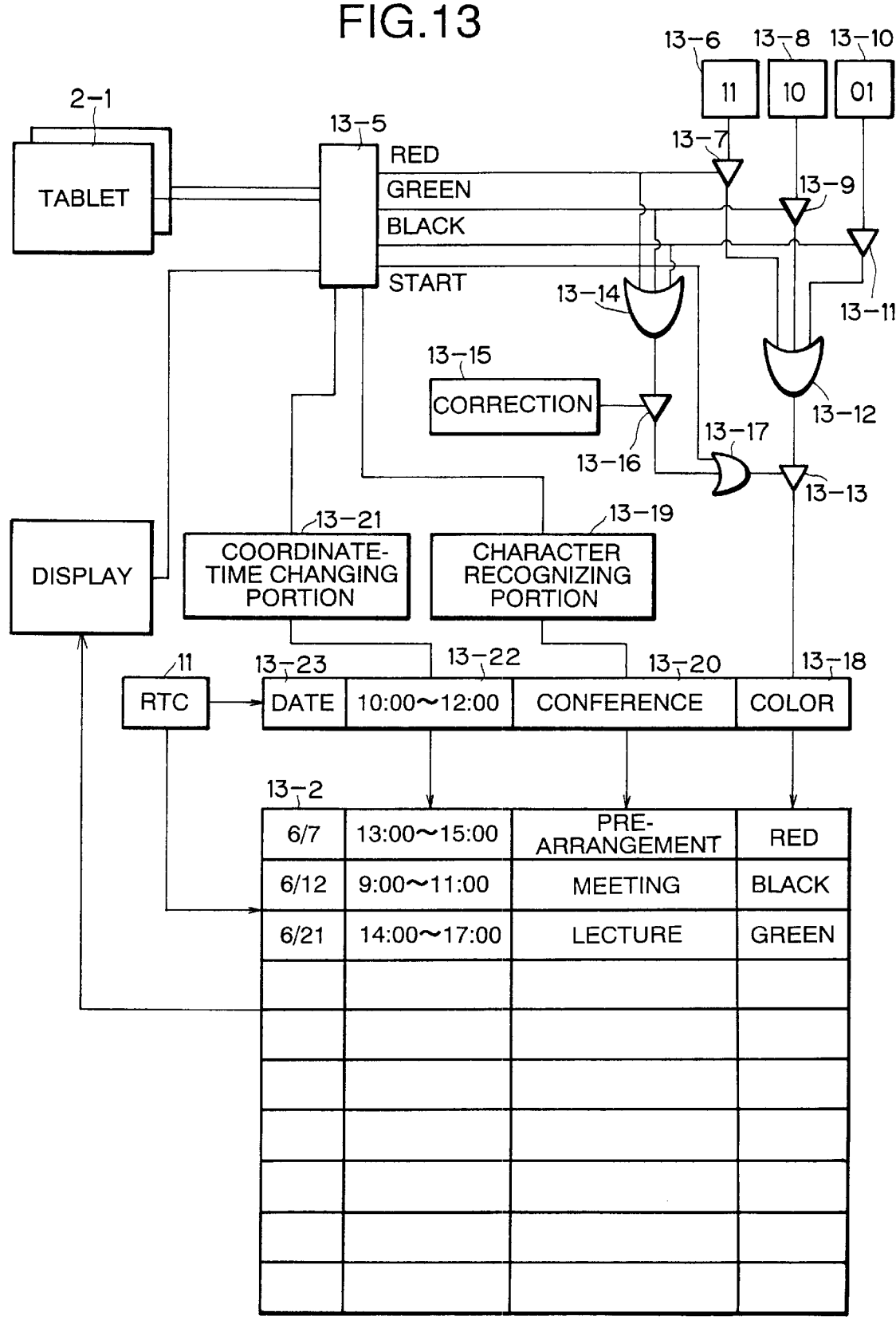
FIG. 13 is a detailed block diagram.

FIG. 12 shows a method of using a pen, FIG. 13 is a detail block diagram and FIGS. 14A, 14B, 15A and 15B are flowcharts describing the operation of the second embodiment. Referring to these drawings, the second embodiment of the present invention will be described below:

As shown in FIGS. 12A, 12B, 12C and 12D, a schedule-time setting area consists of three lines which are supposed to be touched by the pen in such a way that time bands in the first (upper), second (middle) and third (lower) lines may be represented in red, green and black respectively.

FIG. 12A shows the pen being touched with a start time position in the upper line, FIG. 12B shows the pen having been moved (dragged) from the position of FIG. 12A to a schedule ending time position. FIG. 12C shows the pen having been moved (dragged) by a schedule duration in the middle line. FIG. 12D shows a case that all schedule time bands in the three lines are represented in the same color preset by the first touch of the pen with the lines (irrespective of which line or lines are traced).

Referring to the block diagram of FIG. 13, the operation of the embodiment is described as follows:

With a signal of a pen-touched position, which is obtained from a transparent tablet 2-1, a pen motion detecting circuit 13-5 detects an area corresponding to a time-setting position and sends a signal to a gate 13-7 if the upper line of three lines of time-setting position is determined. The gate 13-7 having received a "red" color designating code "11" from the circuit 13-6 is opened by the signal from the circuit 13-5 to transmit the color code "11" to an OR-circuit 13-12. Similarly, a gate 13-9 having received a green-color designating code "10" is open to transmit the color code "10" to the OR-circuit 13-12 if the middle line was touched with the pen. A gate 13-11 having received a black-color designating code "01" is opened to transmit the color code to the OR-circuit 13-12 if the lower line was touched with the pen. The OR-circuit 13-12 sends currently designated color-code to a gate 13—13.

Although the gate 13-16 receives a signal from the pen motion detecting circuit 13-5, it can not be opened since no signal is given from a correction mode selecting circuit 13-15 (i.e., the device being not in the CORRECTION mode). Consequently, a signal "0" is sent to an OR-circuit 13-17. The pen-motion detecting circuit 13-5 transmits, besides the above-mentioned area-detection signal, a pen-travel start signal that is a signal "1" of one pulse to be transmitted to the OR-circuit 13-17 when the pen moves in the horizontal direction. Accordingly, only with a horizontal movement of the pen, the OR-circuit 13-17 sends a signal "1" to the gate 13—13 that is opened to transmit the color-designating code to a buffer 13-18 for storing color codes of schedule data.

With an input of a schedule content by a user, a character recognizing portion 13-19 recognizes each character from pen-stroke data detected by the pen-motion detecting circuit 13-5 and transmits the obtained character data to a buffer 13-20 for storing schedule contents. Characters of the schedule content can be inputted by using a soft keyboard allowing the detection of touched positions.

A coordinate-to-time conversion portion 13-21 determines a designated time-band according to the pen-touch start position and the pen-travel end position and stores the determined time-band data into a buffer 13-22 for storing schedule time. The schedule date read from the RTC 11 is stored into a buffer 13-23 for storing schedule-date. All data are then stored in sequence of date into a schedule storing portion 13-2 of the RAM 13.

Figure 14B:
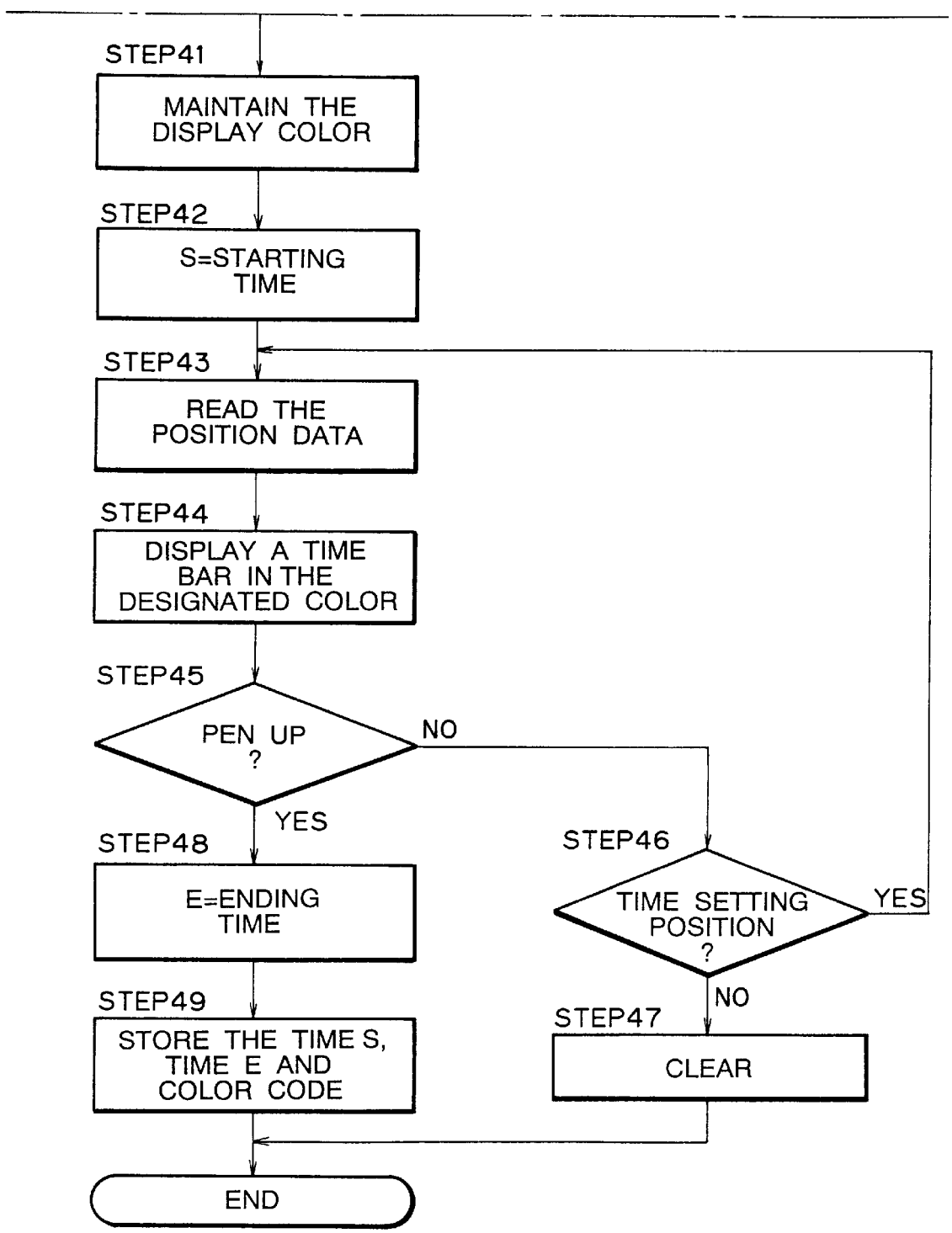
FIG. 14B is a flow chart describing the process of designating a color.

The above-mentioned processing operations are described below according to flowcharts of FIGS. 14A and 14B.

Step 32 detects a pen contacting the screen, Step 33 reads a position where the pen touched and Step 34 determines whether or not the read position is included in a bar chart 17 for setting a schedule time. If the position touched with the pen is out of the position for setting a time, another processing operation required by the position is performed. If the position is the position for setting a schedule time, the process proceeds to Step 35.

Step 35 judges whether the position touched with the pen is on the upper line (i.e., in the first area) or not. If so, the process proceeds to Step 36 where a color designating code is set to "11" representing red color and the process proceeds to Step 40. If not, the process proceeds to Step 37 to examine whether the position touched with the pen is on the second line (in the second area) or not. If so, Step 38 selects a green-color designating code "10" and proceeds to Step 40. If not, Step 39 selects a black-color designating code "01".

Step 40 determines whether the pen was horizontally moved while in touch with the screen. The color designation is effective until the vertical movement of the pen is detected.

The colors selected at Steps 35 to 39 are kept while the pen moves in touch with the screen. At Step 42, the position the pen touched first is stored as a variable S defining the schedule start time. At Step 43, the current touching position of the pen is read. Next at Step 44, the trace of the pen is represented as a time bar in the color stored at Step 42. At Step 45, it is judged whether the pen was separated from the screen or not. If so, the process proceeds to Step 48. If the pen still is in touch with the screen, the process advances to Step 46 whereat it is judged whether or not the pen remains on the schedule-time setting position. If so, the process returns to Step 43 and, then, Steps 43 to 46 are repeated until the pen is lifted from the screen. If the pen is out of the time-setting position, the process advances to Step 47 where the display of the pen trace is cleared.

When the pen was judged as separated from the screen at Step 45, the process proceeds to Step 48 wherein a time corresponding to the position whereat the pen was lifted off the screen is stored as a variable E defining the schedule ending time. Next, Step 49 stores the starting time S and the ending time E together with the color code stored at Step 41.

Thus, the display color of the schedule can be set according to the position with an input from the pen in the time-setting area, enabling the schedule (the trace of the pen) to be displayed in the same color, independent of change in force of the pen during the dragging operation.

Figure 15B:
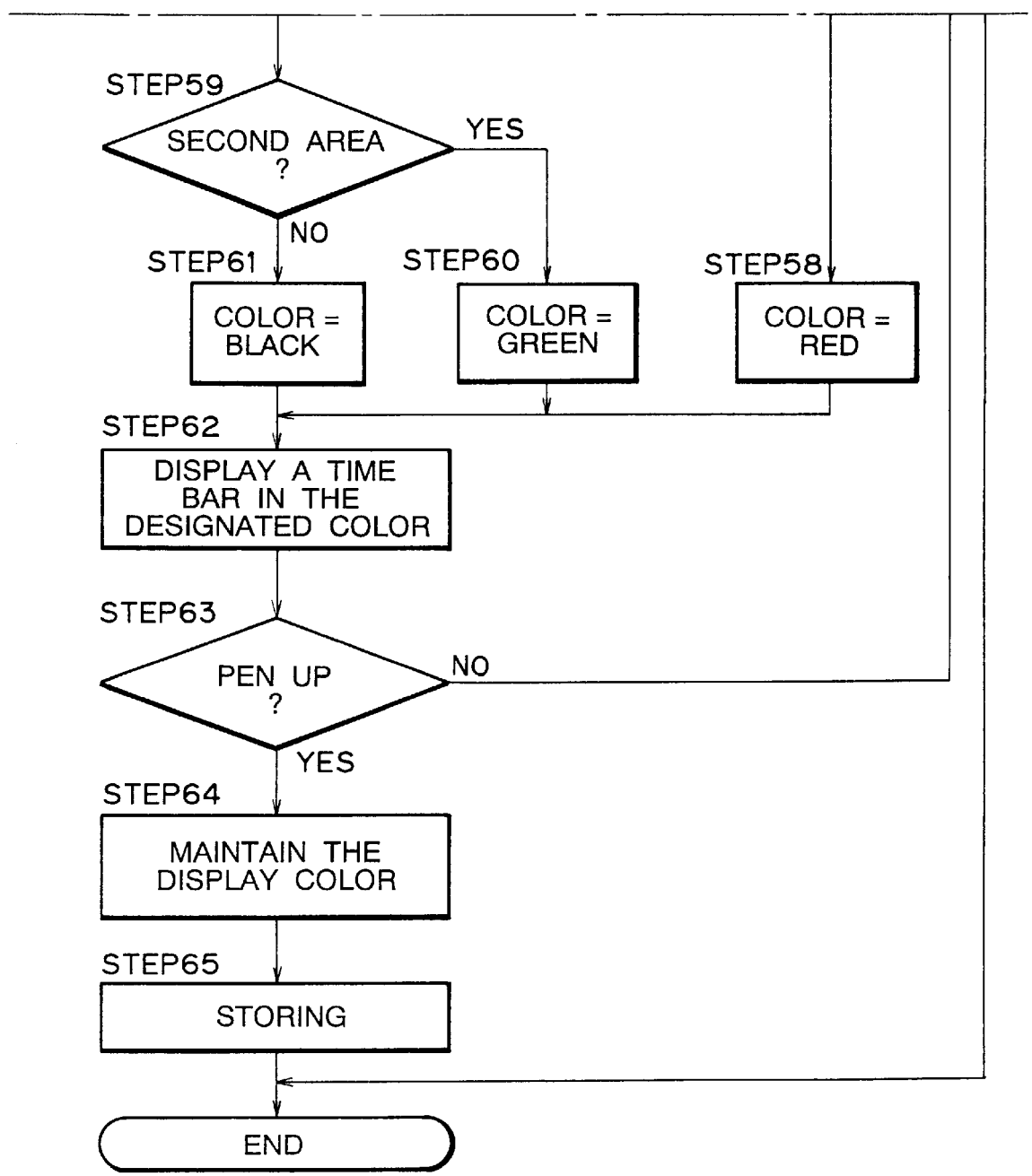
FIG. 15B is a flow chart describing the process of changing a color.

The correction operation for changing a schedule display color inputted by the above-mentioned processing is described below according to the FIGS. 13, 15A and 15B.

In FIG. 13, the correction-mode selecting circuit 13-15 transmits a signal to the gate 13-16 that also receives a color-designating code corresponding to the current position of the pen through the OR-circuit 13-14. The gate 13-17 is open by the effect of the color-designating code and the pen-motion start signal from the pen motion detecting circuit 13-5, which were transmitted thereto through the OR-circuit 13-17.

The gate 13-17 maintains a color code corresponding to the line whereto the pen currently touches and transfers the color code to the buffer 13-18 for storing display color codes of the input schedule data.

The above-mentioned processing operations are described below according to flowcharts of FIGS. 15A and 15B. Step 50 detects that a pen comes into contact with the screen, Step 51 reads color-information position for schedule data to be corrected and Step 52 displays the schedule data in the color which information was read at Step 51. Step 53 detects a touch of the pen with the screen and Step 54 determines whether the touch was made at a position included in a bar chart 17 for setting a schedule time. If the position touched with the pen is out of the position for setting a time, the process proceeds to Step 55 for determining whether the touch was made on the END button indicated on the display screen. If so, the process ends. If another button was pointed by touch of a pen, the process returns to Step 53.

If the touch was made on a position within the area for setting a schedule time, the process proceeds to Step 56 for reading the touched position data. At Step 57, it is judged whether the position touched with the pen is on the upper line (i.e., in the first area) or not. If so, the process proceeds to Step 58 whereat a color designating code is set to "11" denoting red color and the process proceeds to Step 62. If not, the process proceeds to Step 59 to examine whether the touched position is on the second line (in the second area) or not. If so, Step 60 selects a green-color designating code "10" and proceeds to Step 62. If not, Step 61 selects a black-color designating code "01".

Step 62 displays the time bar in the color selected by Steps 57 to 58 (or 59 or 61). At Step 63, it is judged whether the pen was separated from the screen or not. If the pen still is in touch with the screen, the process returns to Step 56 and, then, Steps 56 to 63 are repeated until the pen is lifted from the screen. With the pen separated from the screen, the selected color code is held (at Step 64) and stored in a buffer (at Step 65).

Thus, the display color of the schedule can be set to a new color by shifting the schedule position preset by touch of the pen. The new color corresponds to the new setting position of the schedule.

[Third Embodiment]

Figure 16:
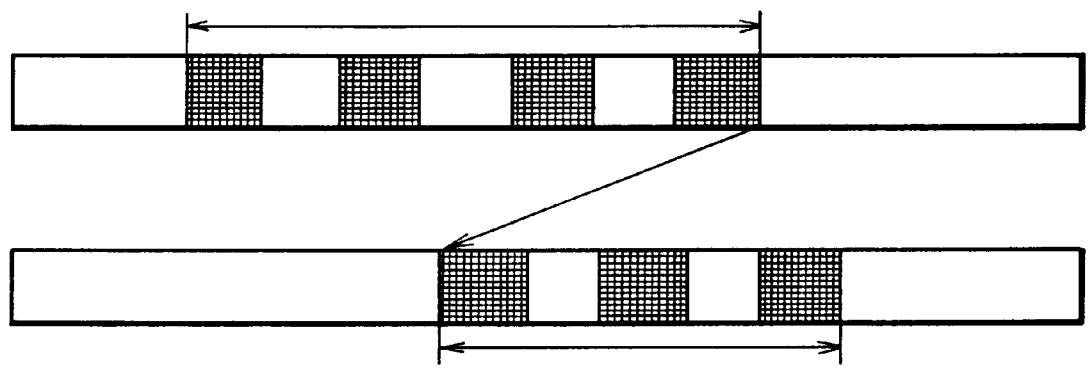
FIG. 16 is a view for explaining a method of using a pen.
Figure 17B:
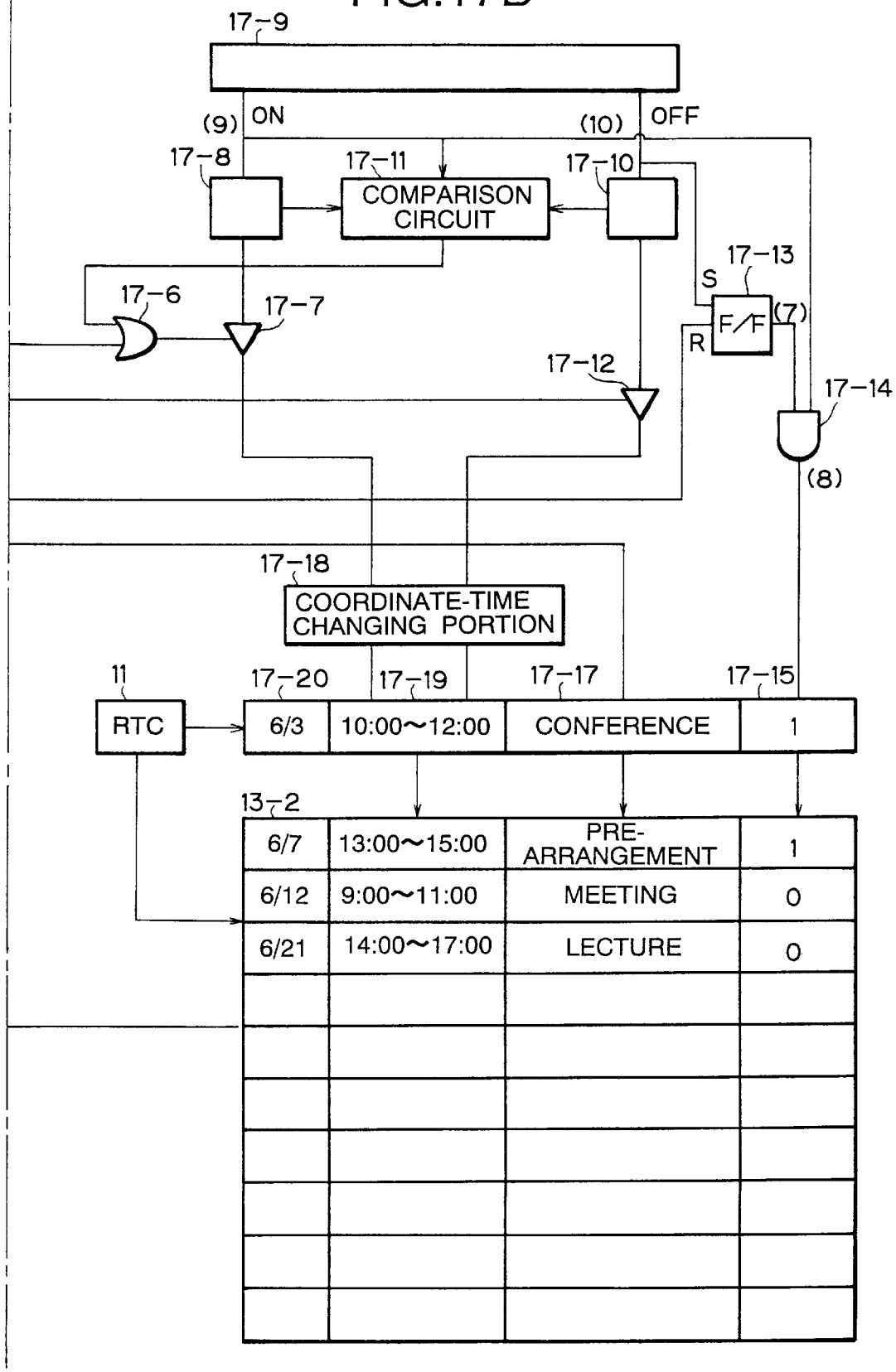
FIG. 17B is a detailed block diagram.
Figure 18:
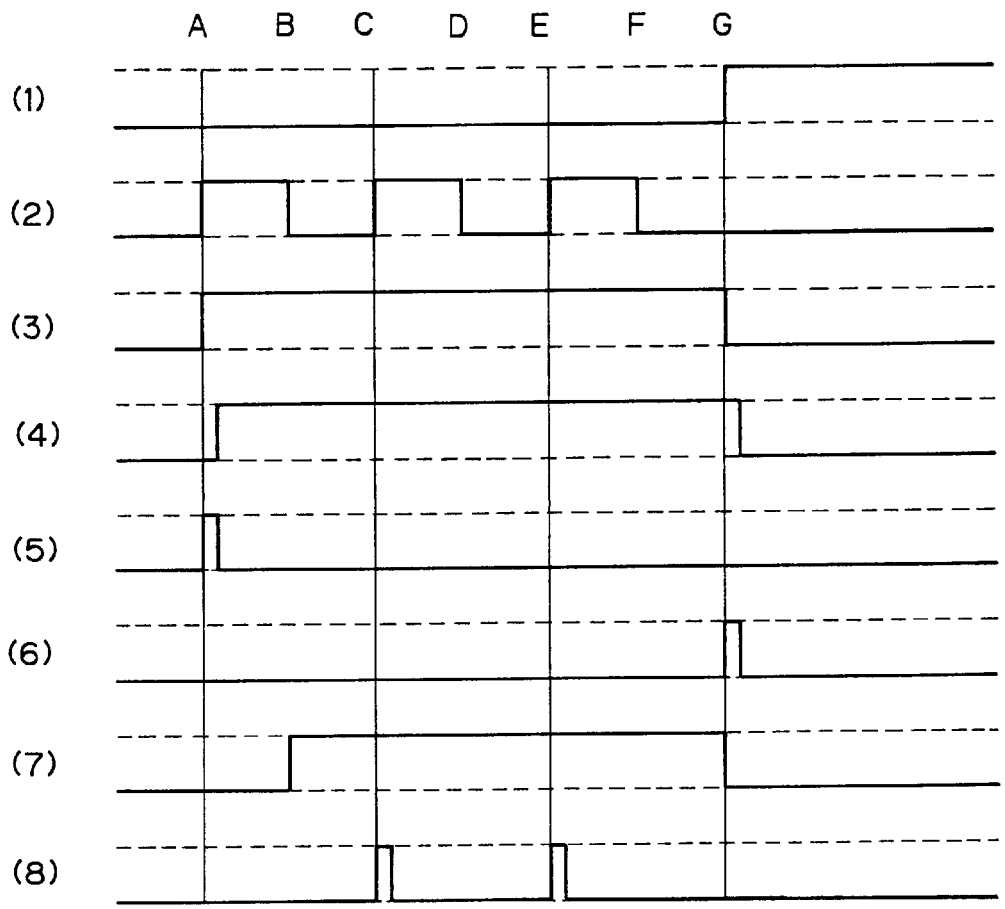
FIG. 18 is a timing chart.
Figure 19:
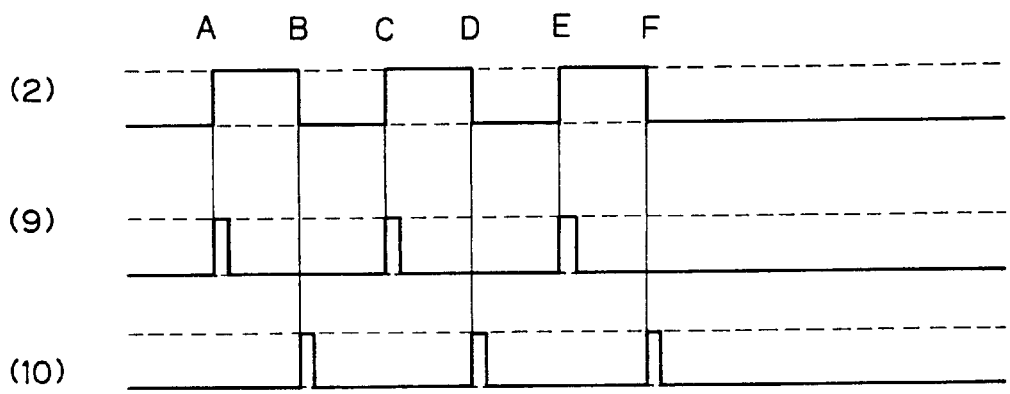
FIG. 19 is a timing chart.
Figure 20B:
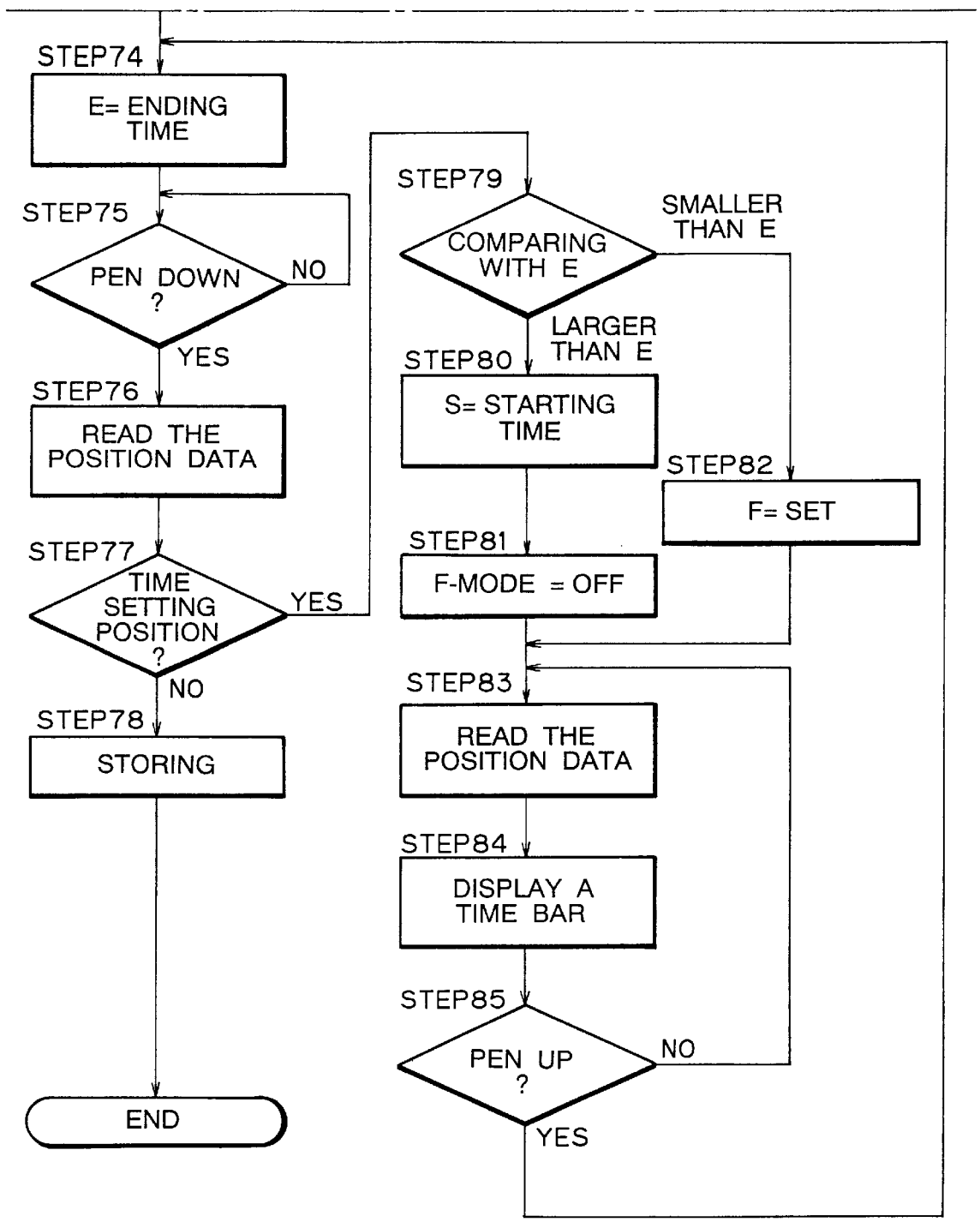
FIG. 20B is a flow chart describing the process of setting a flicker indication.

A third embodiment of the present invention will be described below with reference to FIGS. 16, 17A, 17B, 18, 19, 20A and 20B. FIG. 16 shows the operation of a pen, FIGS. 17A and 17B are detailed block diagrams of the embodiment, FIGS. 18 and 19 are timing charts and FIGS. 20A and 20B are flow charts describing the operation of the embodiment.

In FIG. 16, a user moves a pen along a desired schedule time zone within an area for setting a schedule time on a display screen of the embodiment in the time of usually inputting a schedule into the system. The time zone designated by the trace of the pen is memorized as a scheduled time. If the user desires to flicker the display of scheduled time, he or she traces the desired time zone with periodical breaks in touching of the pen with the screen (as if drawing a broken line) from the left to the right to the schedule end-time as shown in FIG. 16 and then presses the SET key. The above-mentioned discontinuous movement of the pen with setting action are detected, causing the thus scheduled time to flicker on the screen.

The reverse movement of the pen from the right to the left in the line of the schedule time setting area causes the input trace of the pen to be canceled and allows inputting a new correct schedule from the position at which the pen is touching the screen.

Referring to block diagrams of FIGS. 17A and 17B, the above-mentioned operation is described as follows:

A pen motion detecting circuit 17-1 detects a pen-touch information through a transparent tablet 2-1 and outputs a signal "1" from an output (1) if the pen touched a position other than a time bar on the tablet 2-1. A [Pen UP] or [Pen Down] signal "1" or "0" representing a pen touching or separating from the time bar is outputted from an output (2) of the pen motion detecting circuit 17-1. The output signal (2) is also sent to a selecting circuit 17-9 which in turn outputs a pulse signal "1" from its output "ON" (9) (or "OFF" (10)) when having received the signal "1" (or "0") from the pen motion detecting circuit "1". Numeral 17-8 designates a first time-converting circuit for converting coordinates of a position whereat a touch of the pen (Pen Down) occurred into a beginning time and numeral 17-10 designates a second time-converting circuit for converting coordinates of a position where the separation of the pen from the screen (Pen UP) occurred into an ending time.

When the user touches a time bar with a pen, the pen motion detecting circuit 17-1 outputs a signal "1" from its output (2) at a timing "A" (FIG. 18). This signal causes a flip-flop 17-2 to set to "1" at its output (3), which signal is sent to a delay circuit 17-3 and an AND-circuit 17-4 and supplied as inverted to an AND-circuit 17-5. The delay circuit 17-3 has a signal "1" at its output (4) with a delay relative to the timing A, which signal is sent to the AND-circuit 17-5 and enters as inverted to the AND-circuit 17-4. Accordingly, the AND-circuit 17-4 performs the AND-function on the signal "1" from the output (3) of the flip-flop 17-2 and inverted signal "1" from the output (4) of the delay circuit 17-3 and has a signal "1" at its output (5) at the timing A.

Immediately after this, the output (4) of the delay circuit 17-3 turns "1", thereby the AND-circuit 17-4 emits a signal "0" at its output (5) by performing the AND-operation on an inverted signal "0" at the output (4) and a signal "1" at the output (5) of the flip-flop 17-2. The signal (5) represented by one raising pulse defines the schedule beginning time.

When the pen-motion detecting circuit 17-1 detects the separation of the pen from the screen, it generates a signal "0" at its output (2) at a timing B shown in FIG. 18. The signal (2) is sent through the selecting circuit 17-9 to the flip-flop 17-13 which output (7) is thereby set to "1" and emits a signal "1" from its output 2.

A timing C is produced when the user touched again the time bar with the pen. At this time, the pen-motion detecting circuit 17-1 generates a signal "1" at its output (2) and the selecting circuit 17-9 emits a signal "1" from its output (9). Upon receipt of the signals "1" from the flip-flop circuit 17-13 (output (7)) and the selecting circuit 17-9 (output (9)), the AND-circuit 17-14 emits a signal "1" from its output (8). A rising pulse of this signal 1 defines the flashing display-mode setting.

It is now assumed that the user moved the pen to the desired ending time position on the time bar by repeating touching and separating actions and then applied a touch of the pen to a place other than the time bar. At this time, the pen-motion detecting circuit 17-1 emits a signal "1" from its output (1), which signal causes the flip-flop 17-2 to reset its output (3) to zero "0". The signal from the Flip-flop 17-2 is sent a delay circuit 17-3 and an AND-circuit 17-4 and supplied as inverted to an AND-circuit 17-5. The delay circuit 17-3 has a signal "0" at its output (4) with a delay relative to the timing A, which signal is further sent to the AND-circuit 17-5 and enters as inverted to the AND-circuit 17-4.

Before the delay circuit 17-3 changes its output (4) from "1" to "0", the AND-circuit 17-5 performs the AND-operation on the signal "1" from the output (4) of the delay circuit 17-3 and the inverted signal "1" from the output (3) of the flip-flop 17-2 and generates a signal "1" at its output (6). This signal (6) represented by one raising pulse defines the schedule ending time.

The output signal (1) from the pen-motion detecting circuit 17-1 resets the flip-flop 17-13 which output (7) turns to zero. Consequently, the AND-circuit 17-14 emits a signal "0" at its output (8), which signal is input to the AND-circuit 17-5 at the rising time (2).

The comparison circuit 17-11 compares the detected schedule starting time with the detected schedule ending time and, if the starting time is smaller than the ending time, opens the gate 17—17 through the OR-circuit 17-6 to supply the coordinate-time changing portion 17-18 with the coordinates of the schedule starting time-position which is now designated by the touch of the pen.

The above-mentioned processing operations are described below according to flowcharts of FIGS. 20A and 20B. Step 66 cancels the flashing-display-mode setting, then Step 67 waits and detects contacting of the pen with the screen. Step 68 reads a screen position touched by the pen and Step 69 determines whether the read position is included in a bar chart 17 for setting a schedule time. If the position touched by the pen is out of the position for setting a schedule time, another processing operation required by the position is performed. When the pen-touched position exists in the area for setting a schedule time, the process proceeds to Step 70 for storing the pen-touched position as a schedule starting time at the variable S in the expression.

Step 71 reads a next pen-touched position and Step 72 displays in the inverted color mode a time bar starting from the pen-touched position previously stored at the variable S and ending at the current pen-touched position. Step 73 judges whether the pen was separated from the screen or not. With the pen being still in touch with the screen, the process returns to Step 71 and, then, Steps 71 to 73 are repeated until the pen is lifted off the screen.

When the pen is judged as separated from the screen (Step 70), the process proceeds to Step 74 whereby the position whereat the pen was lifted off the screen is stored as a schedule ending time in a variable E. Step 75 waits and detects a next touch of the pen with the screen and Step 76 reads the pen-touched position data. Step 77 determines whether the pen-touched position is in the area for setting a schedule time. If not, the process proceeds to Step 78 whereby the interval from the time of the variable S to the time of the variable E is stored as a schedule time together with F-value (Flash display mode) if such is set. In this case, the flash display mode is not set and the schedule is not displayed in the flash display mode.

When the pen-touched position is in the area for setting a schedule time (at Step 77), Step 79 compares the variable E with the pen-touch position read at Step 76. If the variable E is smaller than the pen-touched position (e.g., the pen-touched position exists on the right side of the variable E), Step 82 sets the flash display mode and then the process proceeds to Step 83. If the variable E is larger than the pen-touched position (e.g., the pen-touched position exists on the left side of the variable E), Step 80 stores the pen-touched position read at Step 76 as a new schedule starting time in the variable S and Step 81 turn off the flash display. Step 83 reads a next pen-touched position and Step 84 displays in the inverted color mode a time bar from the pen-touched position of the variable S to the pen-touched position read by Step 83.

Step 85 judges whether the pen was separated from the screen or not. If not, Steps 83 to 85 are repeated until the pen is lifted off the screen. When the pen was separated from the screen, the process returns to Step 74 where the position whereat the pen was lifted off the screen is stored as the schedule ending time in the variable E. Thus, the Steps 74 to 77 and Steps 79 to 85 are repeated until the pen touches a position out of the area for setting a schedule time.

As described above, it is possible for the user to set the input schedule to be displayed in the flash display mode (in which the schedule bar flickers) by inputting the schedule-length with the pen as if it was plotting a broken line and by F-value set (setting Flash display mode). It is also possible to cancel the already input schedule time by reversing the movement of the pen to the left while inputting the schedule time and to input a new schedule time therefrom.

Variations of the flash display mode may be realized by changing flash duration depending upon intervals between pen-touches.

According to the present invention, it is possible to provide an information processing device which is capable of detecting the force of inputting means against input tablet means, setting a display color designated by the level of the detected pressing force of the inputting means and displaying an input schedule time and content on the display means and which therefore enables a user to easily set a desired display color by a simple operation of applying an adjusted force of the inputting means and to easily input and distinctly display an important schedule on the display screen.

According to the present invention, it is also possible to provide an information processing device which is capable of detecting the movement of the pointing means along the input tablet means and maintaining a display color set by the setting means during the movement of the pointing means and which can therefore display the input schedule in the same color irrespective of uneven force of the inputting means during its movement and enables easily inputting an important schedule therein and distinctly displaying the inputted important schedule thereon.

According to the present invention, it is also possible to provide an information processing device which is capable of detecting a position whereto a force of the pointing means is applied, setting a display color according to the detected pressed position and displaying the inputted schedule time and content in the specified color on the display means and which can therefore set the display color by the pressed position, enabling the user to easily set displaying position, easily input an important schedule therein and distinctly displaying the inputted important schedule thereon.

According to the present invention, it is also possible to provide an information processing device which is capable of detecting the movement of the pointing means along the input tablet means maintaining a display color set by the setting means during the movement of the pointing means and which can therefore display the input schedule in the same color irrespective of uneven force of the pointing means during its movement and enables easily inputting an important schedule therein and distinctly displaying the inputted important schedule thereon.

According to the present invention, it is also possible to provide an information processing device which is capable of detecting the pressing conditions of pointing means to the input tablet means and displaying the inputted schedule time and content in a flash display mode according to the detected conditions of the pointing means and which therefore enables easily inputting therein an important schedule and distinctly displaying the inputted important schedule thereon.

We claim:

1. An information processing device provided with a scheduling function, comprising:

a display, tablet input means integral with the display, a pointer for specifying an input point on a time-axis displayed on the display, a detector for detecting a pressing force on the tablet input means according to an instruction given by the pointer, setting means for setting a display color according to the pressing force detected by the detector, thereby specifying an input time on the time-axis via the pointer and the display color via the setting means in a single step operation, and a controller for controlling the display to display thereon the input time and a content of a schedule corresponding to the input time in a color designated by the setting means.

2. An information processing device as defined in claim 1, wherein a displacement on the tablet input means according to the pointer is detected and a display color set by the setting means is maintained during the movement of the input point in the pointer.

3. An information processing device provided with a scheduling function, comprising:

a display, tablet input means integral with the display, a pointer for specifying an input point on a time-axis displayed on the display, a detector for detecting a pressing position on the tablet input means according to an instruction given by the pointer, setting means for setting a display color according to the pressing position detected by the detector, thereby specifying an input time on the time-axis via the pointer and the display color via the setting means in a single step operation, and a controller for controlling the display to display thereon the input time and a content of a schedule corresponding to the input time in the color designated by the setting means.

4. An information processing device as defined in claim 3, wherein a displacement on the tablet input means according to the pointer is detected and a display color set by the setting means is maintained during the movement of the input point in the pointer.

5. An information processing device provided with a scheduling function, comprising:

a display, tablet input means integral with the display, a pointer for specifying an input point on a time-axis displayed on the display, a detector for detecting a pressing state on the tablet input means according to an instruction given by the pointer, setting means for setting a display color according to the pressing state detected by the detector, thereby specifying an input time on the time-axis via the pointer and the display color via the setting means in a single step operation, and a controller for controlling the display to display thereon by flickering an input time and a content of a schedule corresponding to the input time in the color designated by the setting means.

6. An information processing device provided with a scheduling function, comprising:

a display;

a tablet input device formed integral with the display;

a pointer selectively engageable with the tablet input device, the pointer specifying an input point on a time-axis displayed on the display;

a detector operatively coupled with the tablet input device, the detector detecting a characteristic of the pointer on the tablet input device;

a setting device communicating with the detector, the setting device in a single step operation setting an input time and a display color according to the characteristic of the pointer detected by the detector; and a controller communicating with the setting device and the display, the controller controlling the display to display thereon the input time and a content of a schedule corresponding to the input time in the display color set by the setting device.

7. An information processing device as defined in claim 6, wherein the characteristic of the pointer on the tablet input device comprises a pressing force.

8. An information processing device as defined in claim 6, wherein the characteristic of the pointer on the tablet input device comprises a pressing position.

9. A method of scheduling an event and an importance of the event with an information processing device including a display and a tablet input device formed integral with the display, the method comprising:

(a) specifying with a pointer an input point on a time-axis displayed on the display;

(b) detecting a characteristic of the pointer on the tablet input device;

(c) simultaneously setting in a single step operation an input time and a display color according to the characteristic of the pointer; and (d) controlling the display to display thereon the input time and a content of a schedule corresponding to the input time in the display color set in step (c).

10. A method as defined in claim 9, wherein step (b) is practiced by detecting a pressing force of the pointer.

11. A method as defined in claim 9, wherein step (b) is practiced by detecting a pressing position of the pointer.

* * * * *